(12) United States Patent
Ikeda et al.

(10) Patent No.: US 7,394,732 B2
(45) Date of Patent: *Jul. 1, 2008

(54) OBJECT LENS DRIVE DEVICE, AND DISC RECORDING AND/OR REPRODUCING APPARATUS

(75) Inventors: Naoto Ikeda, Kanagawa (JP); Teruaki Higashihara, Tokyo (JP)

(73) Assignee: Sony Corporation, Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 11/415,206

(22) Filed: May 2, 2006

(65) Prior Publication Data

US 2006/0193216 A1    Aug. 31, 2006

Related U.S. Application Data

(63) Continuation of application No. 10/433,613, filed on Jun. 17, 2003, now Pat. No. 7,046,590.

(51) Int. Cl.
    *G11B 7/09* (2006.01)
(52) U.S. Cl. ............... 369/44.15; 369/44.22; 369/44.24; 369/112.24; 369/244.1
(58) Field of Classification Search ............... 369/44.15, 369/44.22, 44.24, 112.24, 244.1, 44.16, 44.21, 369/44.14; 359/814, 824, 900; 720/685
See application file for complete search history.

(56) References Cited

U.S. PATENT DOCUMENTS

| 4,302,830 | A | 11/1981 | Hamaoka et al. |
| 4,555,780 | A | 11/1985 | Koide |
| 5,327,417 | A | 7/1994 | Tanaka et al. |
| 5,488,594 | A | 1/1996 | Kobayashi et al. |
| 6,172,958 | B1 | 1/2001 | Mochizuki et al. |
| 6,181,671 | B1 | 1/2001 | Ikawa et al. |
| 7,046,590 | B2 * | 5/2006 | Ikeda et al. ............... 369/44.15 |

(Continued)

FOREIGN PATENT DOCUMENTS

JP    60/140549    7/1985

(Continued)

*Primary Examiner*—Hoa T. Nguyen
*Assistant Examiner*—Kim Chu
(74) *Attorney, Agent, or Firm*—Oblon, Spivak, McClelland, Maier & Neustadt, P.C.

(57) ABSTRACT

The present invention is directed to an object lens drive device adapted for moving an object lens in a focus direction of optical axis direction and in a tracking direction perpendicular to the optical axis direction, and includes a fixed position provided in such a manner that a supporting shaft is projected, a movable portion comprised of an object lens, and a bobbin adapted so that the object lens is attached and a hole through the supporting shaft is inserted is formed, the bobbin being supported movably along the supporting shaft and rotatably with the supporting shaft being as center, a drive portion including a magnet portion provided at either one of the fixed potion and the movable portion, and a coil portion provided at the other portion to move the movable portion along the supporting shaft to thereby move the object lens in the focus direction, and to rotate the bobbin with the supporting shaft being as center to thereby move the object lens in the tracking direction, and supporting means including a magnetic member for supporting the movable portion in the state inclined with respect to the supporting shaft.

20 Claims, 32 Drawing Sheets

U.S. PATENT DOCUMENTS

2003/0007430 A1   1/2003   Ikeda et al.

FOREIGN PATENT DOCUMENTS

| JP | 62-78737 | 4/1987 |
|----|----------|--------|
| JP | 35521/1989 | 3/1989 |
| JP | 46919/1990 | 3/1990 |
| JP | 7-226056 | 8/1995 |
| JP | 9-44873 | 2/1997 |
| JP | 9-73642 | 3/1997 |
| JP | 9-305991 | 11/1997 |
| JP | 10-162389 | * 6/1998 |
| JP | 11-232672 | 8/1999 |

* cited by examiner

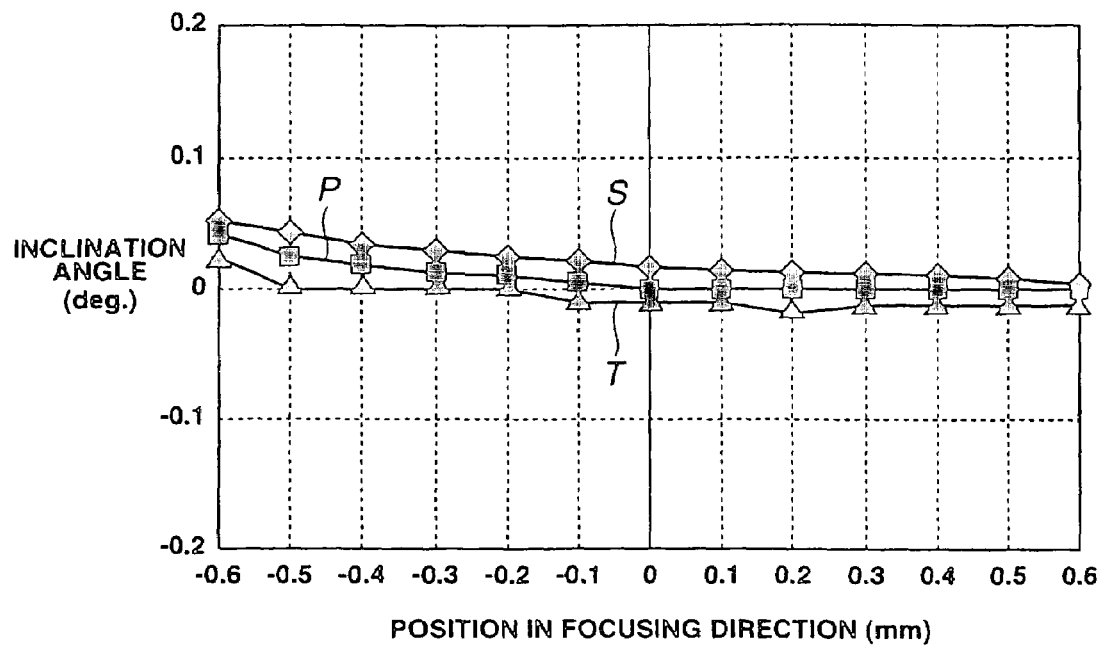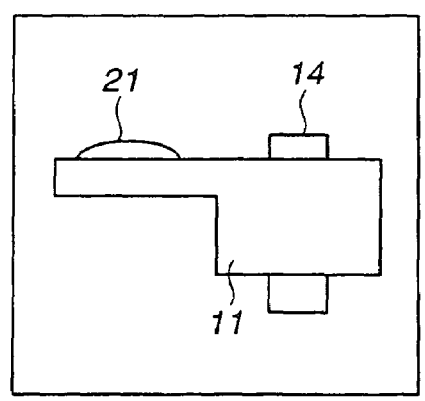
FIG.10

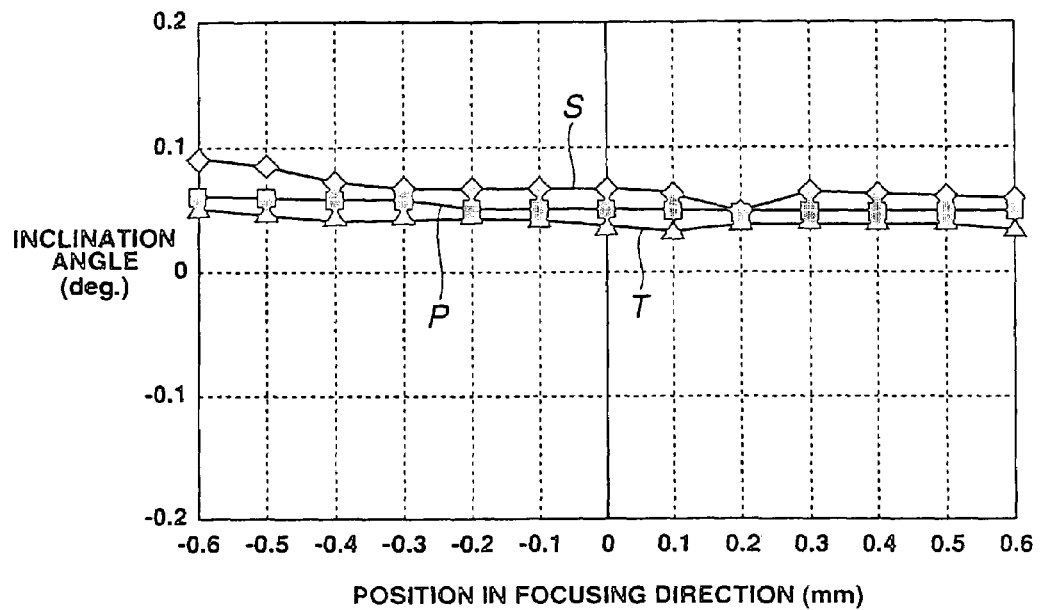
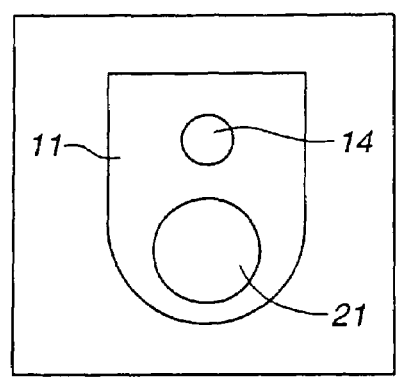
FIG.11

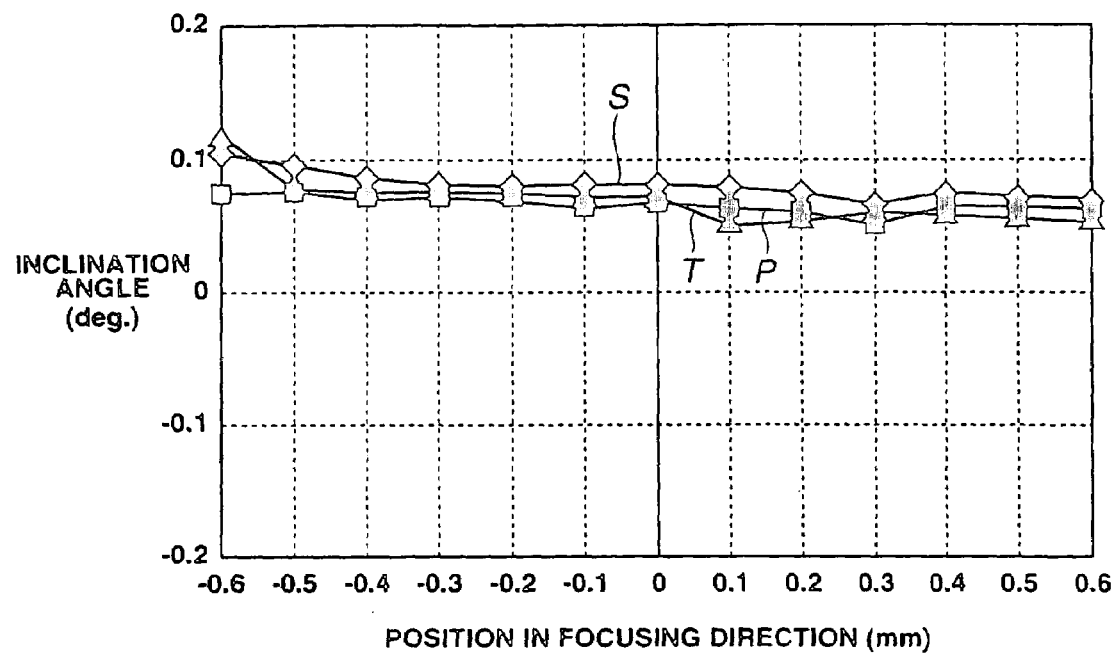
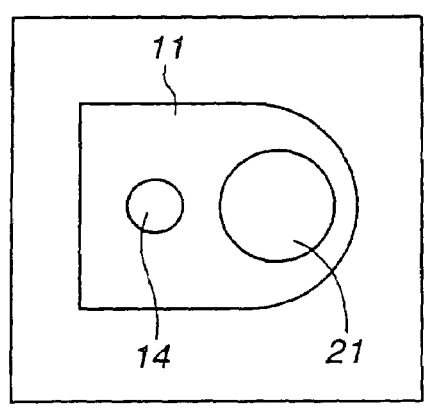
FIG.12

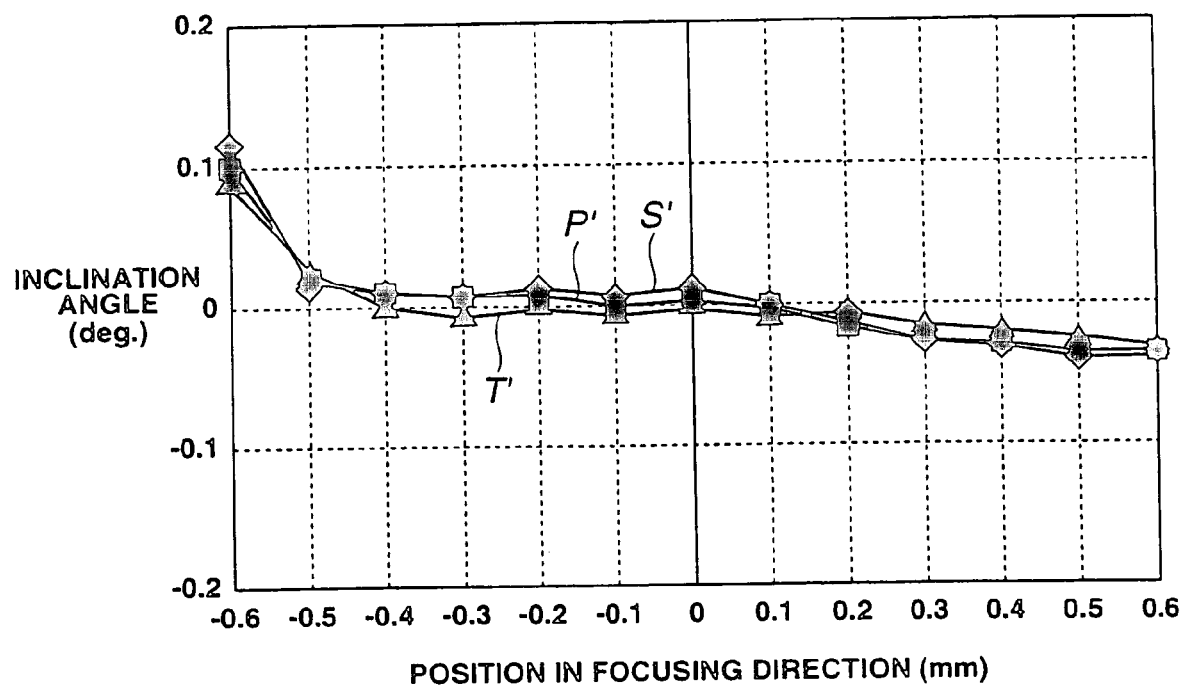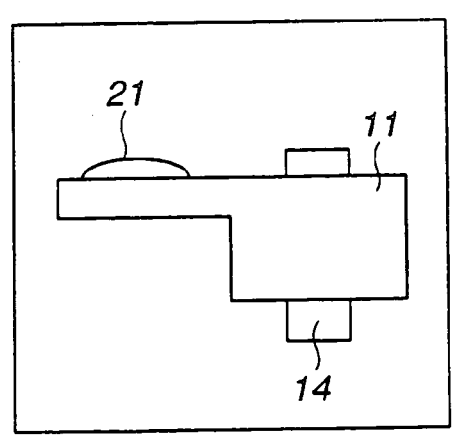
FIG.13

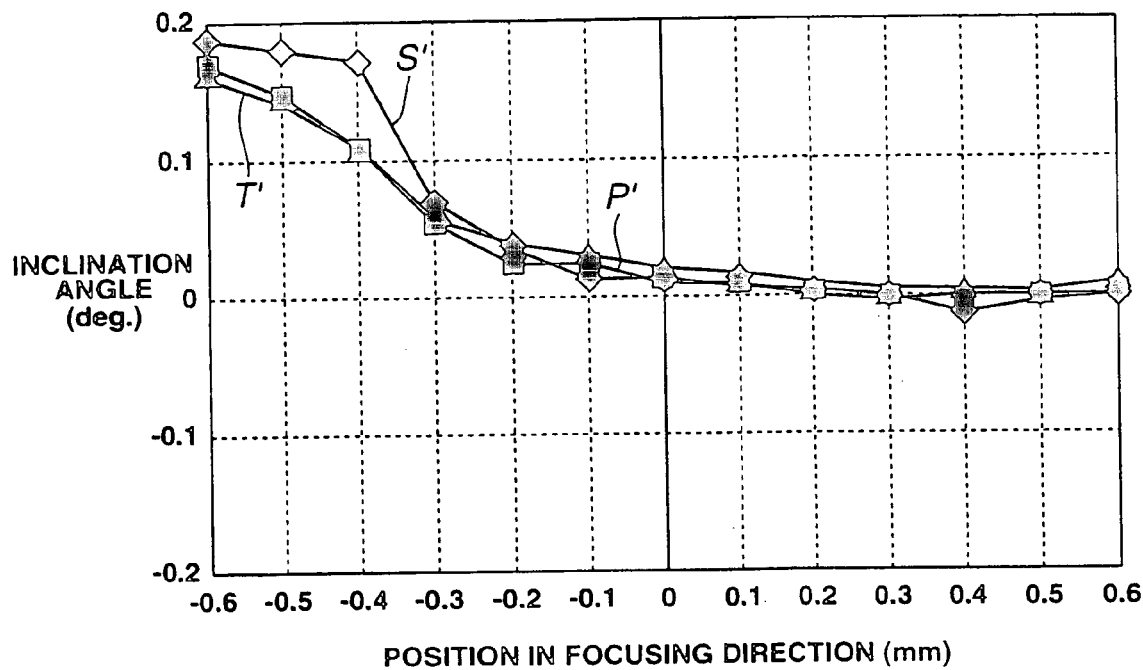
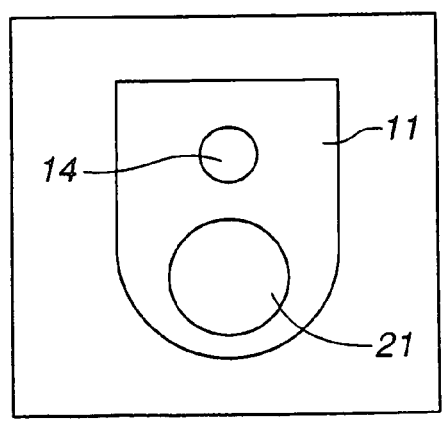
FIG.14

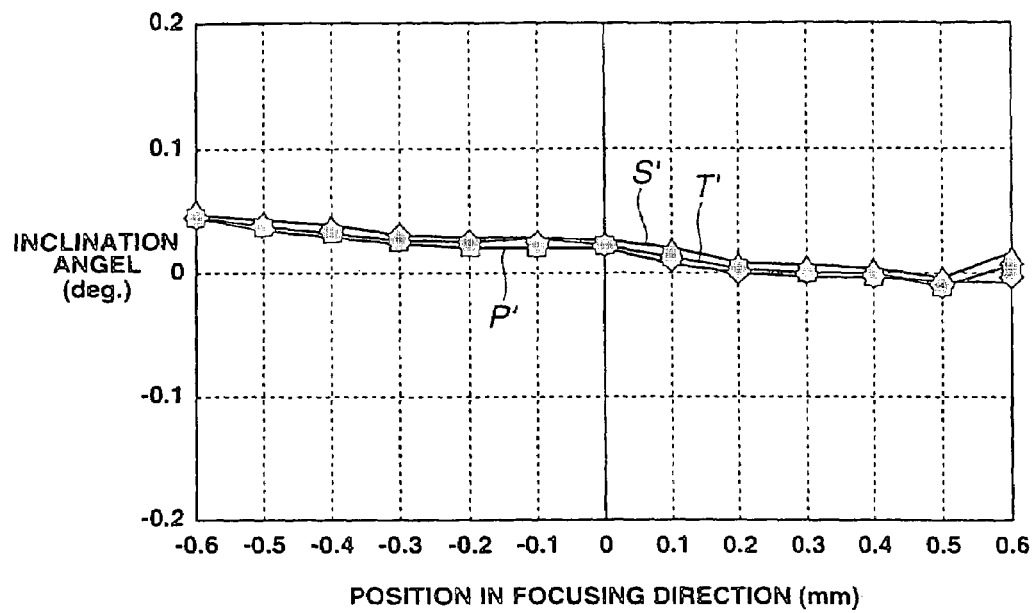
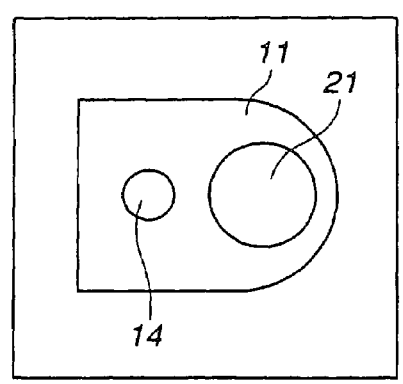
FIG.15

US 7,394,732 B2

OBJECT LENS DRIVE DEVICE, AND DISC RECORDING AND/OR REPRODUCING APPARATUS

This application is a con of Ser. No. 10/433,613 Jun. 18, 2003 U.S. Pat. No. 7,046,590.

TECHNICAL FIELD

The present invention relates to an object lense drive device adapted so that a movable portion in which object lens (objective) is attached is supported movably along the supporting shaft and rotatably with the supporting shaft being as center, and a disc recording and/or reproducing apparatus using such an object lens drive device.

BACKGROUND ART

As an apparatus adapted for carrying out recording of information signals ono a disc-shaped recording medium such as optical disc, etc. and for carrying out reproduction (playback) of information signals recorded on the disc-shaped recording medium, there are used disc drive apparatuses. In the disc drive apparatuses of this kind, there is used an object lens drive device adapted for converging light beams emitted from light source onto the signal recording surface of a disc-shaped recording medium to irradiate them thereto, and for allowing such light beams to follow recording tracks formed at the disc-shaped recording medium. The object lens drive device is adapted so that a movable portion in which an object lense (objective) for converging light beams emitted from light source onto the signal recording surface of the disc-shaped recording medium is attached is supported movably along the supporting shaft and rotatably with the supporting shaft being as center. The object lens drive device carries out a focus control to move the movable portion in the axial direction of the supporting shaft in parallel to the optical axis of the object lens in accordance with focus error signal to thereby carry out control of in-focus position of the object lens, and carries out a tracking control to rotate the movable portion in the direction about the axis of the supporting shaft in a direction perpendicular to the optical axis of the object lens in accordance with a tracking error signal so that light beams follow recording tracks of the disc-shaped recording medium.

In the case of the object lens drive device of the shaft slidable and rotatable type adapted so that the movable portion in which object lens is attached is supported at the supporting shaft, as compared to the object lens drive device in which the movable portion is cantilever-supported by elastic displacable supporting arm with respect to the fixed portion so that it is permitted to undergo displacement in the focusing direction and in the tracking direction, since weight balance of the movable portion is satisfactory, there are the merits that vibration proof characteristic in the tracking direction of the direction perpendicular to the focusing direction of the direction in parallel to the object lens is excellent, and displacement of the movable portion by self-weight is small, etc.

In the object lens drive device of the shaft slidable and rotatable type, since supporting shaft is inserted into a supporting hole formed at bobbin constituting the movable portion so that the movable portion is supported rotatably in a direction about the axis of the supporting shaft and slidably in the axial direction, there is a predetermined clearance between the supporting hole and the supporting shaft. As a result, at the time of focus control when the movable portion is moved in a direction in parallel to the optical axis of the object lens, and at the time of tracking control when the movable portion is rotated in a direction perpendicular to the optical axis direction of the object lens, the movable portion would be inclined in an arbitrary direction with respect to the supporting shaft by clearance between the supporting hole and the supporting shaft. When the movable portion is inclined in an arbitrary direction with respect to the supporting shaft in this way, the inclination direction is changed when the movable portion is moved in the focusing direction or in the tracking direction so that the operation becomes unstable. As a result, it becomes impossible to precisely carry out the focus control and the tracking control of the object lens. It becomes impossible to allow light beams to be precisely in focus with respect to the signal recording surface of the disc-shaped recording medium and to allow them to precisely follow recording tracks. It becomes impossible to precisely carry out recording or reproduction of information signals.

In view of the above, in the object lens drive device of the shaft slidable and rotatable type provided in the conventional disc drive apparatus, e.g., tension in a predetermined direction is rendered to the movable portion by making use of elasticity of flexible printed board to always incline the movable portion in a predetermined direction with respect to the supporting shaft to thereby prevent change (fluctuation) in the inclination direction of the movable portion.

As stated above, in the object lens drive device adapted for rendering tension in a predetermined direction to the movable portion by the flexible printed board to prevent change (fluctuation) in the inclination direction of the movable portion, when the movable portion is caused to undergo movement operation, tension changes. As a result, it is impossible to securely prevent change (fluctuation) in the inclination direction of the movable portion. Thus, it becomes impossible to precisely carry out focus control and tracking control of the object lens.

In the disc drive apparatus which can be used as portable equipment, attitude of the object lens drive device changes in dependency upon use circumstances. Thus, direction of gravity with respect to movement direction of the movable portion changes. By influence of this gravity, inclination direction with respect to the supporting shaft of the movable portion changes. As a result, the operation of the movable portion becomes unstable.

In the object lens drive device of the shaft slidable and rotatable type, in order to reduce, as minimum as possible, inclination angle when inclination with respect to the supporting shaft of the movable portion is changed, there exist some object lens drive devices in which length of the supporting hole of the movable portion through which the supporting shaft is inserted is elongated. However, when length of the supporting hole is elongated, it becomes difficult to realize thin structure of the object lens drive device.

In order to prevent inclination with respect to the supporting shaft of the movable portion, there is also proposed an object lens drive device adapted for rendering biasing force in a direction perpendicular to the focusing direction to the movable portion to press the movable portion onto the supporting shaft to allow it to slide and rotate in the state caused to be linearly in contact therewith. In such an object lens drive device, not only slidability with respect to the supporting shaft of the movable portion is deteriorated because the movable portion is caused to be linearly in contact with the supporting shaft, but also the center axis of the supporting shaft and the center axis of the supporting hole are not caused to be in correspondence with each other. For this reason, the movable portion is not permitted to be smoothly slid and rotated with respect to the supporting shaft, and it also becomes impossible to carry out precise focus control and tracking control in accordance with focus error signal or tracking error signal.

DISCLOSURE OF THE INVENTION

An object of the present invention is to provide a novel object lens drive device which can solve problems that conventional object lens drive devices as described above have, and a disc recording and/or reproducing apparatus using such an object lens drive device.

Another object of the present invention is to provide an object lens drive device which can realize precise focus control corresponding to focus error signal, and can realize precise tracking control corresponding to tracking error signal, and a disc recording and/or reproducing apparatus using such an object lens drive device.

A further object of the present invention is to provide an object lens drive device which can realize miniaturization of the device itself, and a disc recording and/or reproducing apparatus using such an object lens drive device.

An object lens drive device proposed in order to attain objects as described above comprises: a fixed portion provided in such a manner that a supporting shaft is projected; a movable portion composed of an object lens, and a bobbin adapted so that the object lens is attached and a hole through which the supporting shaft is inserted is formed, the bobbin being supported movably along the supporting shaft and rotatably with the supporting shaft being as center; a drive portion including a magnet portion provided at either one of the fixed portion and the movable portion, and a coil portion provided at the other portion to move the movable portion along the supporting shaft to thereby move the object lens in a focus direction, and to rotate the bobbin with the supporting shaft being as center to thereby move the object lens in a tracking direction; and supporting means for supporting the movable portion in the state inclined with respect to the supporting shaft.

The supporting means comprises a magnetic member attached to the movable portion to hold the movable portion at the neutral position in the focus direction and in the tracking direction in cooperation with the drive portion. The magnetic member is attached to the movable portion in a manner inclined with respect to the supporting shaft.

As the supporting means constituting the object lens drive device according to the present invention, there may be used supporting means comprising a magnetic member attached to a movable portion to hold the movable portion at the neutral position in the focus direction and in the tracking direction in cooperation with the drive portion, and a flexible printed wiring board adapted so that a portion thereof is respectively attached to the fixed portion and the movable portion to supply power to the coil portion.

The flexible printed wiring board used here is attached in such a manner that width direction of a junction portion which connects the fixed portion and the movable portion is different from the focus direction, and is different from the tracking direction.

In the object lens drive device according to the present invention, in the state where power is not supplied to the coil portion, position in the focus direction with respect to the fixed portion of the movable portion by balance between gravity and elastic force of the flexible printed wiring board is set at the fixed portion side with respect to movement end of the fixed portion side within the movement range in the focus direction of the movable portion.

A disc recording and/or reproducing apparatus according to the present invention comprises: a rotational drive unit adapted so that a disc is loaded to rotationally drive the loaded disc; an optical pick-up; and a feed mechanism for moving the optical pick-up in a radial direction of the disc. The optical pick-up used here comprises an object lens drive unit including a fixed portion provided in such a manner that a supporting shaft is projected, a movable portion composed of an object lens and a bobbin adapted so that the object lens is attached and a hole through which the supporting shaft is inserted is formed, the bobbin being supported movably along the supporting shaft and rotatably with the supporting shaft being as center, a drive portion including a magnet portion provided at either one of the fixed portion and the movable portion, and a coil portion provided at the other portion to move the movable portion along the supporting shaft to thereby move the object lens in the focus direction, and to rotate the bobbin with the supporting shaft being as center to thereby move the object lens in the tracking direction, and supporting means for supporting the movable portion in the state inclined with respect to the supporting shaft.

Still further objects of the present invention and practical merits obtained by the present invention will become more apparent from the description of the embodiments which will be given below with reference to the attached drawings.

BRIEF DESCRIPTION OF THE DRAWINGS

FIGS. 10 to 12 show the result in which the relationship between position in focusing direction of movable portion and inclination angle with respect to supporting shaft portion of movable portion is measured with respect to respective installation states of the movable portion, wherein FIG. 10 is a graph showing measurement result in the state where axial direction of supporting shaft portion is vertical direction, FIG. 11 is a graph showing measurement result in the state where axial direction of supporting shaft is horizontal direction and object lens is placed at the lower portion of supporting shaft, and FIG. 12 is a graph showing measurement result in the state where axial direction of supporting shaft is horizontal direction and object lens is placed at the side direction of the supporting shaft.

FIGS. 13 to 15 show the result in which the relationship between position in focusing direction of movable portion and inclination angle with respect to supporting shaft of movable portion is measured with respect to respective installation states of movable portion in conventional object lens drive device, wherein FIG. 13 is a graph showing measurement result in the state where axial direction of supporting shaft is vertical direction, FIG. 14 is a graph showing measurement result in the state where axial direction of supporting shaft is horizontal direction and object lens is placed at the lower portion of supporting shaft, and FIG. 15 is a graph showing measurement result in the state where axial direction of supporting shaft is horizontal direction and object lens is placed at the side direction of supporting shaft.

BEST MODE FOR CARRYING OUT THE INVENTION

An object lens drive device and a disc recording and/or reproducing apparatus using such an object lens drive device according to the present invention will now be described with reference to the attached drawings.

It is to be noted that explanation will be given in the following explanation by taking the example where the object lens drive device according to the present invention is applied to a disc drive unit (apparatus) in which optical disc is used as recording medium.

Figure 1:
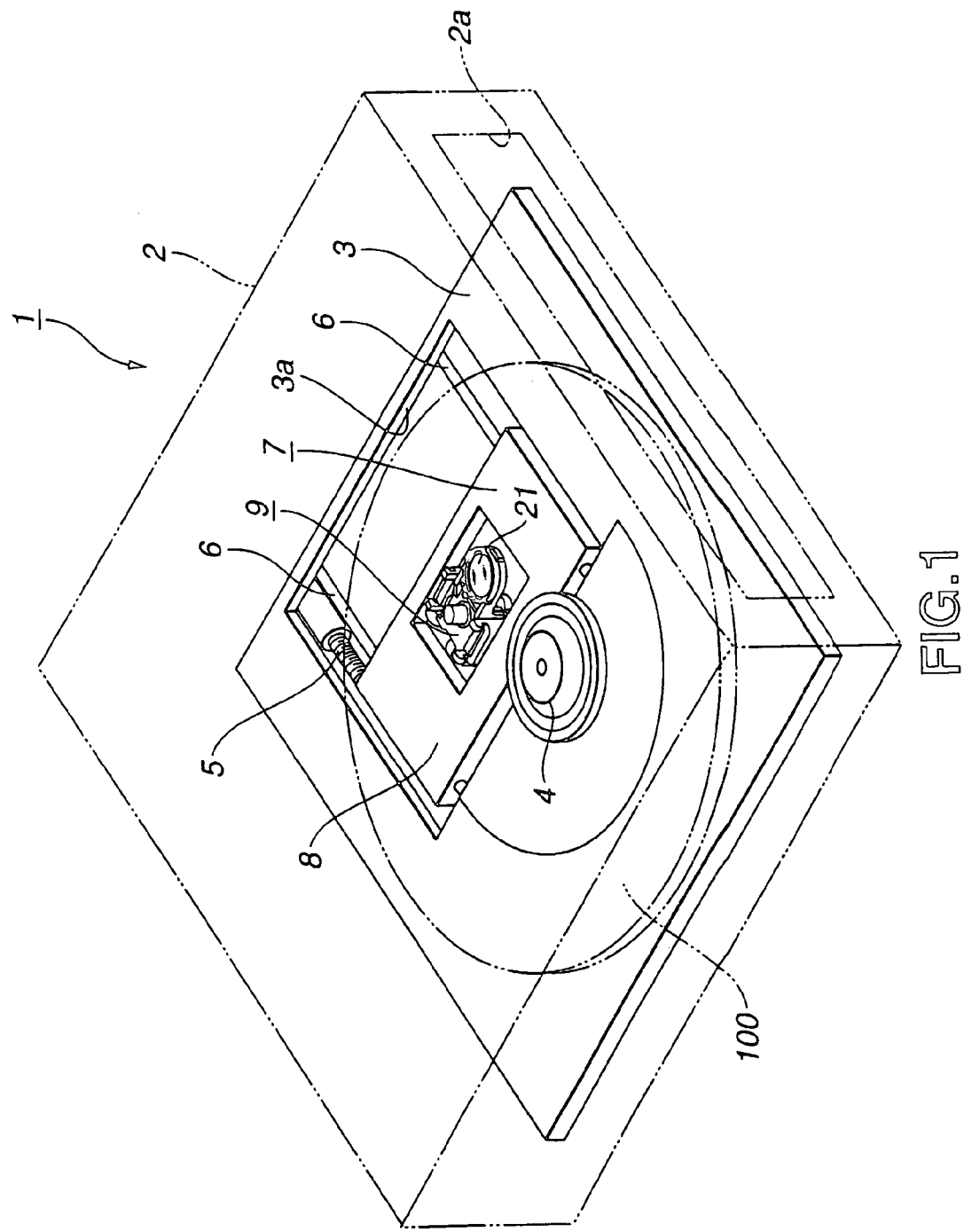
FIG. 1 is a perspective view showing a disc drive apparatus in which an object lens drive device according to the present invention is used.

As shown in FIG. 1, the disc drive unit 1 in which the object lens drive device according to the present invention is used is adapted so that, within a thin box-shaped casing 2, there are provided a rotation drive mechanism for rotationally driving an optical disc 100, and mechanisms and/or electronic circuit units necessary for carrying out recording or reproduction (playback) of information signals with respect to the optical disc 100 such as an optical pick-up 7, etc. for carrying out recording of information signals with respect to the optical disc 100 rotationally driven by this rotation drive mechanism and/or for carrying out read-out of information signals recorded on the optical disc 100 to constitute the unit body.

At the front surface of the casing 2, as shown in FIG. 1, there is formed an insertion/withdrawal hole 2a for carrying out insertion/withdrawal of the optical disc 100. The insertion/withdrawal hole 2a is formed so as to take laterally elongated rectangular shape. Within the casing 2, as shown in FIG. 1, a chassis 3 is disposed. At the lower surface side of substantially central portion of the chassis 3, there is disposed spindle motor (not shown) for rotationally driving the optical disc 100. At the front end portion of the spindle shaft of the spindle motor, a disc table 4 is attached so that it is rotated in one body. At the chassis 3, an arrangement hole 3a for projecting the disc table 4 is formed. As shown in FIG. 1, the disc table 4 attached to the spindle shaft is projected from the arrangement hole 3a toward the upper direction of the chassis 3.

At the lower surface side of the chassis 3, as shown in FIG. 1, a lead screw 5 and a pair of guide shafts 6, 6 are arranged in the parallel state. At the arrangement hole 3a formed at the chassis 3, the optical pick-up 7 is disposed in the state where it can be moved in the radial direction of the optical disc 100 loaded on the disc table 4.

The optical pick-up 7 is adapted so that light source such as semiconductor laser, etc. and optical element for guiding light beans emitted from the light source to object lens, etc. are mounted on a movement base 8. At the optical pick-up 7, one end portion of the movement base 8 is screw-connected to the lead screw 5 and both end portions of the movement base 8 are respectively slidably supported by the guide shafts 6, 6. The optical pick-up 7 is moved in the radial direction of the optical disc 100 in a manner guided by the guide shafts 6, 6 by rotation of the lead screw 5.

An object lens drive device 9 comprises, as shown in FIGS. 2 to 5, a fixed portion 10 formed by magnetic metallic material, and a movable portion 11 supported by this fixed portion 10.

Figure 2:
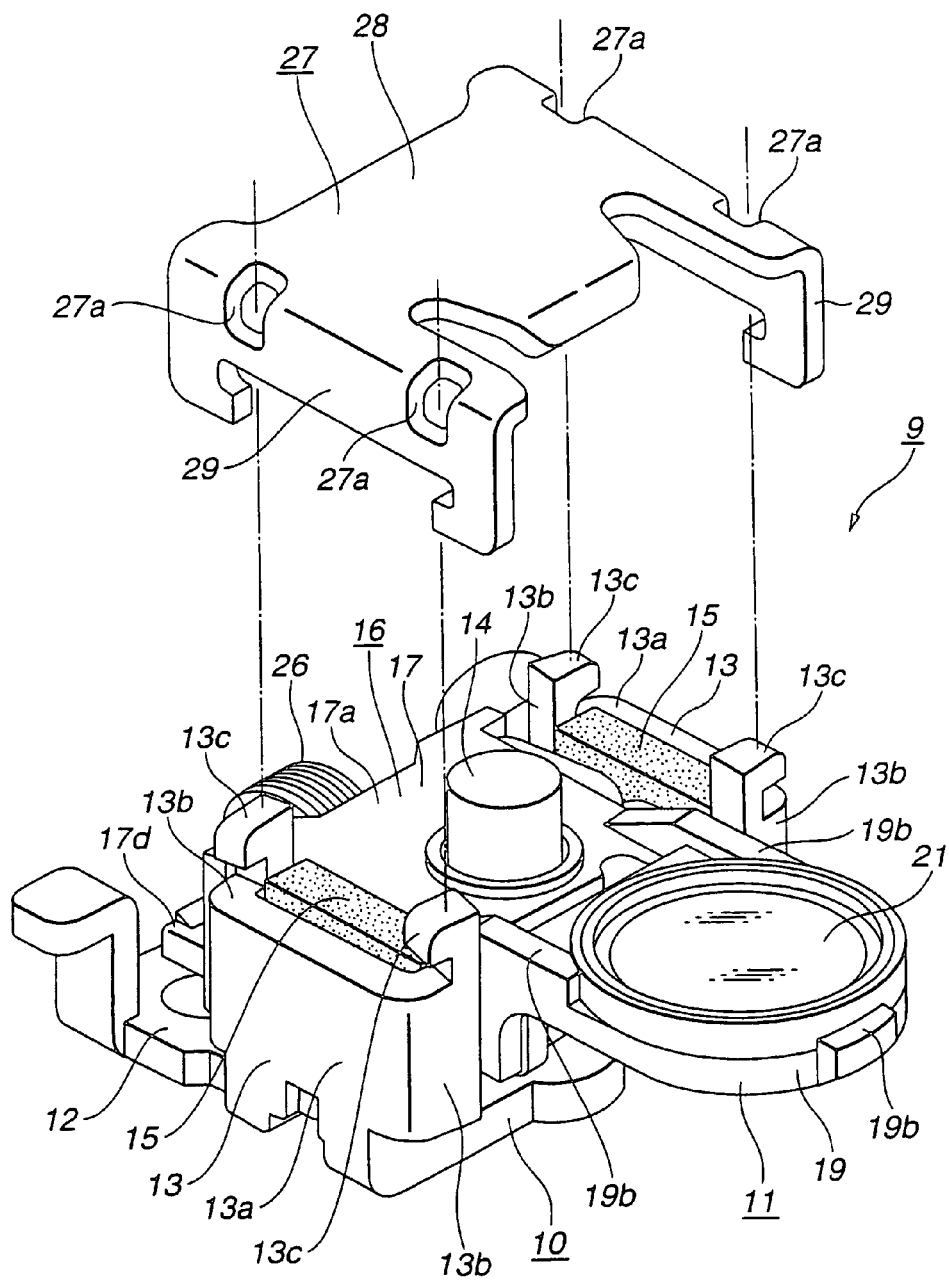
FIG. 2 is a perspective view showing the object lens drive device in the state where cover is separated.
Figure 3:
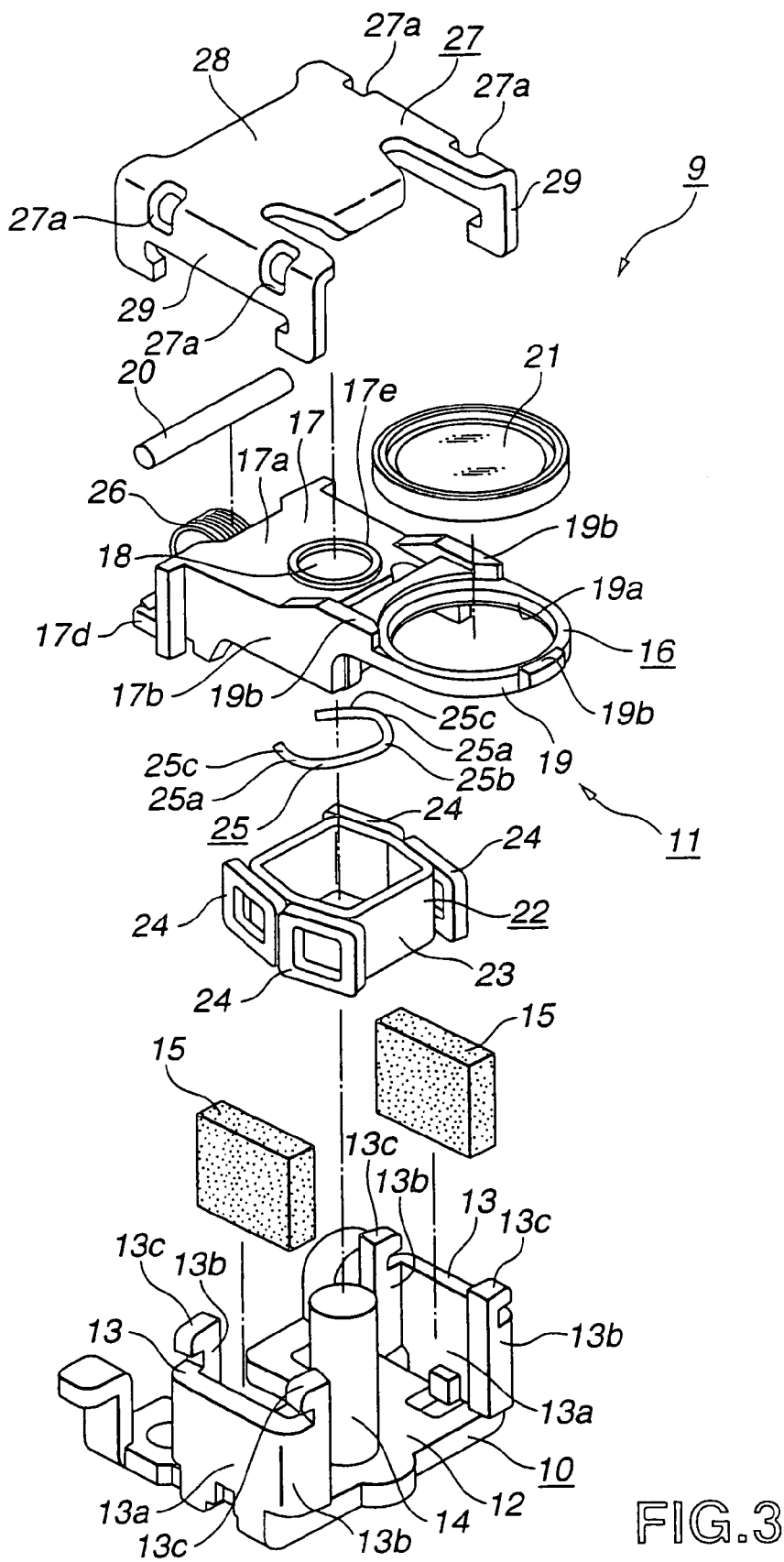
FIG. 3 is an exploded perspective view of the object lens drive device.

The fixed portion 10 includes, as shown in FIGS. 2 and 3, a base portion 12 attached on the upper surface of the movement base 8, a pair of yoke portions 13, 13 formed in a manner bent respectively toward the upper direction from both side edges of this base portion 12, and a supporting shaft 14 projected toward the upper direction substantially from the central portion of the base portion 12.

The yoke portion 13 is composed of an attachment portion 13a, and bent portions 13b, 13b formed in the state bent so as to oppose the inside from both side edges before and after of this attachment portion 13a. At the upper side of these bent portions 13b, 13b, engagement projected portions 13c, 13c are formed in a projected manner.

At the internal surfaces of the respective yoke portions 13, 13, magnets 15, 15 are respectively fixed. The magnets 15, 15 are adapted so that surfaces of the sides opposite to each other, i.e., surfaces of the sides opposite to the supporting shaft 14 are polarized (magnetized) so that they have the same pole. The surfaces opposite to each other of the respective magnets 15, 15 are polarized (magnetized) so that they have either one of S-pole and N-pole. In this example, the surfaces opposite to each other of the respective magnets 15, 15 are polarized (magnetized) so as to indicate S-pole. As shown in FIG. 2, the magnets 15, 15 are adapted so that respective surfaces of both sides perpendicular to the surface attached to the yoke portions 13, 13 are respectively covered by the pair of bent portions 13b, 13b.

At a bobbin 16 of the movable portion 11, necessary respective members such as a focusing coil 23 and tracking coils 24, 24, etc. are attached.

The bobbin 16 includes, as shown in FIG. 3, a body portion 17, and a lens holder 19 projected toward the forward direction from this body portion 17. The body portion 17 includes an upper surface portion 17a, side surface portions 17b, 17b projected toward lower direction from both side edges of this upper surface portion 17a, and a back surface portion 17c projected toward the lower direction from the rear edge of the upper surface portion 17a, wherein a balancer attachment portion 17d is projected toward backward direction from the lower edge of the back surface portion 17c (see FIG. 5). Substantially at the central portion of the upper surface portion 17a, a cylindrical supporting cylinder 17e projected toward lower direction is provided (see FIG. 5). The internal space of the supporting cylinder 17e of the body portion 17 is used as a supporting hole 18 of the supporting shaft 14 (see FIG. 5).

A transmission hole 19a is formed at the lens holder 19, and plural holding projected portions 19b are provided at the outer periphery thereof.

Figure 5:
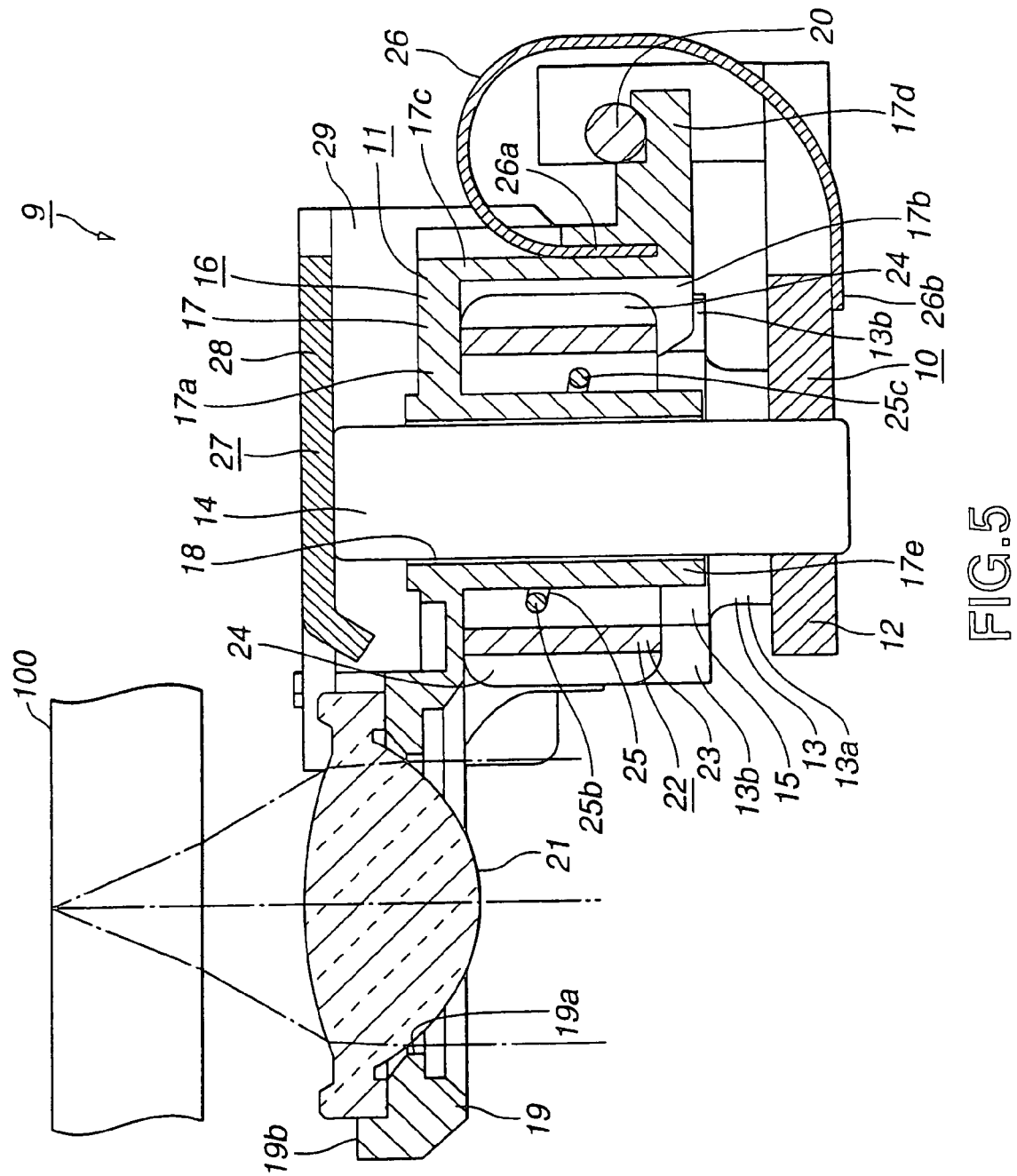
FIG. 5 is a cross sectional view along the V-V line of FIG. 4 shown in the state where cover is attached.

At the balancer attachment portion 17d of the bobbin 16, as shown in FIGS. 3 and 5, a round shaft-shaped balancer 20 is attached.

Figure 4:
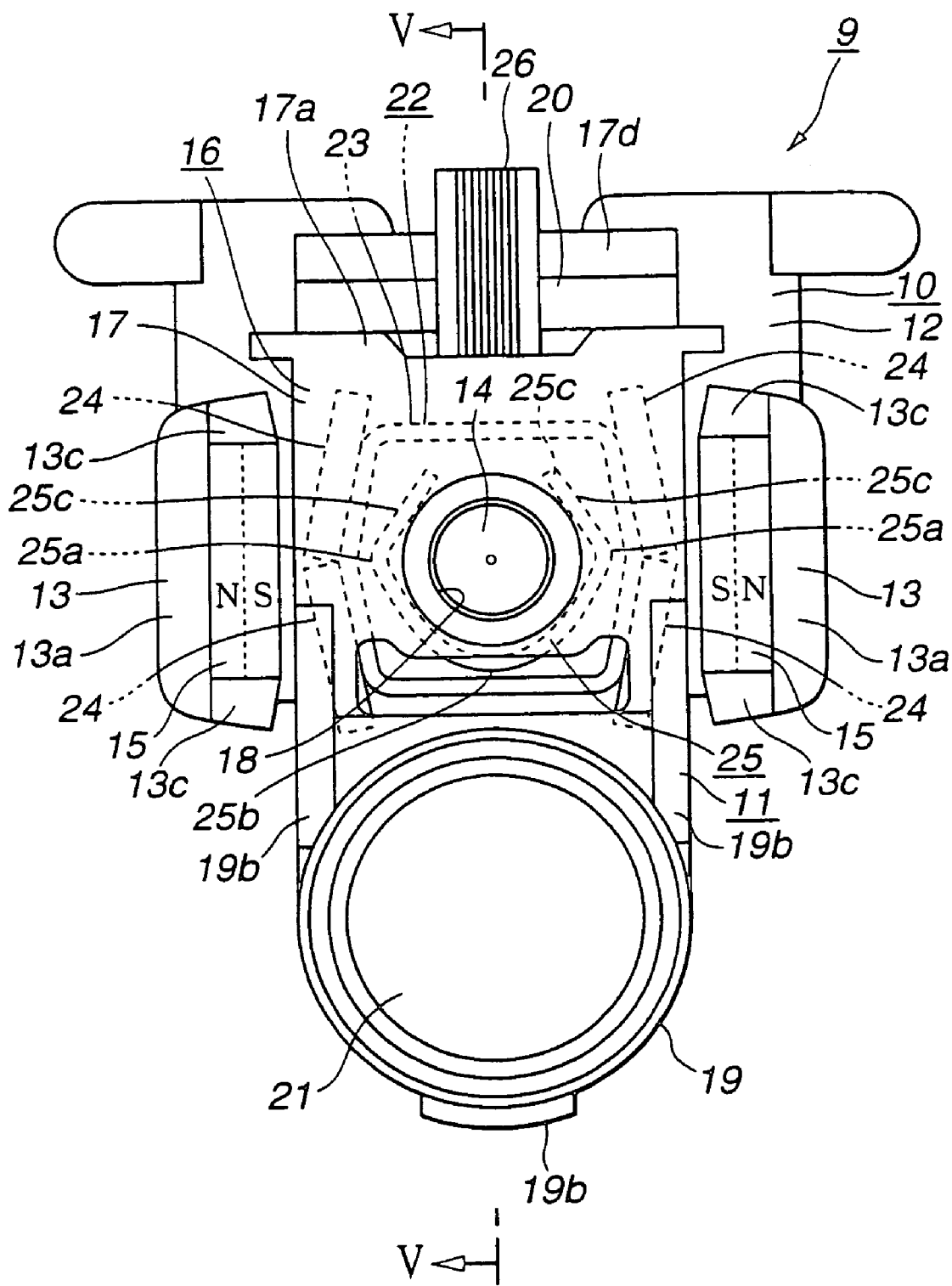
FIG. 4 is a plan view of the object lens drive device shown in the state where cover is detached.

At the lens holder 19 provided at the bobbin 16, as shown in FIG. 4, an object lens 21 is held in the state where it is pressed and supported from the periphery by plural holding projected portions 19b.

At the lower surface of the upper surface portion 17a of the bobbin 16, a coil body 22 is attached (see FIGS. 3 to 5). The coil body 22 comprises the focusing coil 23 wound substantially in rectangular cylindrical form so that the axial direction is upper and lower directions, and the tracking coils 24, 24 by one pair which are attached to side surfaces opposite to each other of this focusing coil 23 in the state where they are adjacent to each other and are in parallel with each other before and after.

At the supporting cylinder 17e of the bobbin 16, a magnetic member 25 formed to be substantially annular by linear magnetic metallic material is attached (see FIGS. 3 to 5). In this example, as shown in FIG. 3, the magnetic member 25 is formed so as to take annular shape where a portion is opened. Namely, the magnetic member 25 includes a connecting portion 25b curved to be semi-circular of the central portion, and a pair of end portions 25c, 25c extended from both ends of this connecting portion 25b. The magnetic member 25 is formed to be annular by bending end portions 25c, 25c so that they are close to each other to extend them from both ends of the connecting portion 25b. At the magnetic member 25 formed to be annular in this way, connecting portions to the connecting portion 25b of the end portions 25c, 25c are caused to be projected portions 25a, 25a bent so as to project toward both sides. These pair of projected portions 25a, 25a are formed in a manner projected toward the external from circle serving as center of the magnetic member 25 formed to be annular. Namely, at the magnetic member 25, the respective projected portions 25a, 25a are formed to be annular in the state bent in a manner projected toward the side direction, whereby distance between the pair of projected portions 25a, 25a becomes maximum. Thus, the magnetic member 25 is caused to have shape in which these projected portions 25a, 25a are placed at the outermost side.

Figure 6:
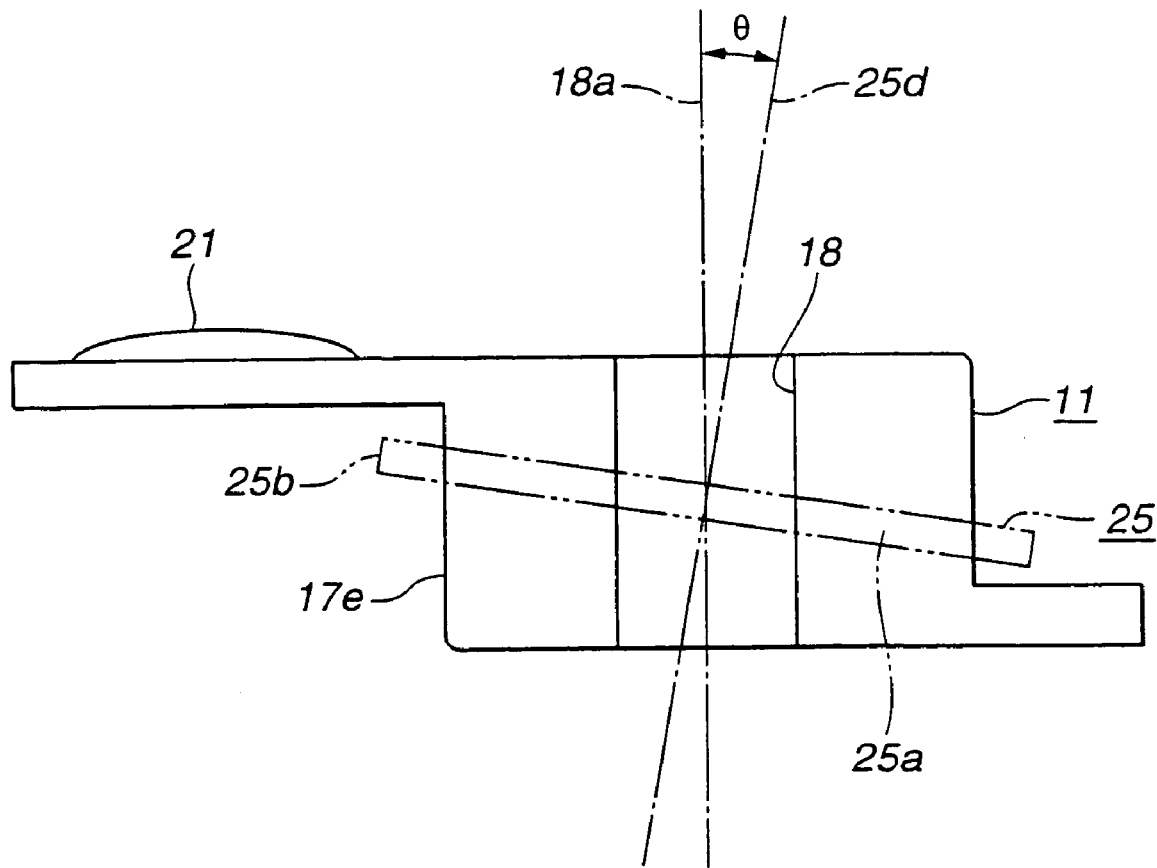
FIG. 6 is a side view of movable portion indicating the relationship between magnetic member and supporting hole.

As shown in FIGS. 4 and 5, the magnetic member 25 is fitted and disposed at the outer periphery of the supporting cylinder 17e in the state where the connecting portion 25b is positioned at the lens holder 19 side where the object lens 21 is attached, and the pair of projected portions 25a, 25a are positioned at both sides of the supporting cylinder 17e. At this time, the magnetic member 25 is attached to the supporting cylinder 17e in the forward rising state inclined so that the connecting portion 25b is positioned at the front end side of the supporting shaft 14 which is the upper side from the end portions 25c, 25c of the opening side. At this time, at the magnetic member 25, as shown in FIG. 4, the respective projected portions 25a, 25a are placed in the state where they are closest to the respective magnets 15, 15 of both sides. As shown in FIG. 6, the magnetic member 25 fitted and disposed at the outer periphery of the supporting cylinder 17e in this way is adapted so that its center axis 25d is inclined by angle θ toward the backward side of the side opposite to the lens holder 19 with respect to center axis 18a of the supporting hole 18.

As the result of the fact that the supporting shaft 14 is inserted into the supporting hole 18, the movable portion 11 is supported slidably in the axial direction of the supporting shaft 14 and rotatably in the direction about the axis of the supporting shaft 14 (see FIGS. 2, 4 and 5). The axial direction of the supporting shaft 14 is the focusing direction where the position of the object lens 21 is controlled so that light beams irradiated through the object lens 21 are irradiated onto the signal recording surface of the optical disc 100 in focus state, and the direction about the axis of the supporting shaft 14 is the tracking direction where light beams irradiated through the object lens 21 follow recording tracks of the optical disc 100.

In the state where the movable portion 11 is supported at the supporting shaft 14, as shown in FIGS. 2 and 4, the magnets 15, 15 are positioned in the state close to the outside of respective side surface portions 17b, 17b of the bobbin 16 and opposite thereto. In the state where the movable portion 11 is supported by the supporting shaft 14, as shown in FIG. 5, one end portion 26a of a flexible printed wiring board 26 is attached to the bobbin 16, and the other end portion 26b of the flexible printed wiring board 26 is attached to the base portion 12 of the fixed portion 10. The one end portion 26a of the flexible printed wiring board 26 attached to the bobbin 16 is electrically connected to the focusing coil 23 and the respective tracking coils 24, and the other end portion 26b of the flexible printed wiring board 26 attached to the base portion 12 is connected to drive circuit (not shown) for operating the object lens drive device 9.

At the fixed portion 10, a cover 27 which covers the movable portion 11 is attached (see FIGS. 2, 3 and 5). The cover 27 is adapted so that a top plate 28 and side plates 29, 29 projected toward the lower direction from left and right both side edges of the top plate 28 are integrally formed by magnetic metallic material, and plural engagement holes 27a are formed in a manner spaced before and after at the portion where the top plate 28 and the side plate portions 29, 29 are continuous. The cover 27 is attached to the fixed portion 10 as the result of the fact that engagement projected portions 13c provided at the fixed portion 10 are respectively engaged with the respective engagement holes 27a (see FIG. 2).

Then, explanation will be given in connection with the operation in which the optical disc 100 is loaded with respect to the disc drive unit 1 using the above-described object lens drive device 9 to carry out recording or reproduction of information signals.

In order to record information signals onto the optical disc 100 or to reproduce information signals recorded on the optical disc 100, the optical disc 100 is loaded with respect to the disc table 4. At the time point when the optical disc 100 is loaded with respect to the disc table 4, recording switch or reproduction switch (not shown) is operated. When the recording switch or the reproduction switch is operated, the spindle motor is driven. Thus, the disc table 4 is rotated in one body with the optical disc 100. When the optical disc 100 is rotated, light beams are emitted from light emitting element like semiconductor laser provided at the movement base 8, and are irradiated onto the signal recording surface of the optical disc 100 through the object lens 21.

Light beams which have been irradiated onto the signal recording surface of the optical disc 100 are reflected by the signal recording surface, and are incident on light receiving element provided at the movement base 8, at which they are caused to undergo photoelectric conversion. Thus, recording or reproduction of information signals is carried out.

When recording or reproduction of information signals is carried out, light beams are irradiated onto the signal recording surface of the optical disc 100 in the in-focus state. Thus, focusing control and tracking control of the object lens 21 are carried out by the object lens drive device 9 in a manner to follow recording tracks. At the time of focusing control, the movable portion 11 is slid in the axial direction of the supporting shaft 14 so that beam spot of light beams irradiated through the object lens 21 is irradiated onto the recording surface of the optical disc 100 in the in-focus state. At the time of tracking control, the movable portion 11 is rotated in the direction about the axis of the supporting shaft 14 so that beam spot of light beams irradiated through the object lens 21 is caused to be in-focus state on recording tracks of the optical disc 100.

The movable portion 11 is held at the neutral position in the focusing direction and in the tracking direction in the inoperative state where it is not driven in both directions of the focusing direction and the tracking direction. Namely, at the movable portion 11, in the inoperative state, the respective projected portions 25a, 25a closest to the respective magnets 15, 15 projected toward both sides of the magnetic member 25 fitted and disposed at the supporting cylinder 17e are attracted by the respective magnets 15, 15 so that they are held at the neutral position in the tracking direction. Further, at the magnetic member 25, the connecting portion 25b is attached in the state inclined by angle θ with respect to the supporting cylinder 17e in a manner positioned at the front end side of the supporting shaft 14, whereby the connecting portion 25b is attracted toward the cover 27 side by action of magnetic field produced from the respective magnets 15, 15. As a result, the end portions 25c, 25c of the opening side are attracted toward the base portion 12 side, and are held in the state rotated in the direction indicated by arrow M in FIG. 7. Namely, the movable portion 11 is held at the neutral position in the focusing direction where the movable portion 11 is supported in the state where it is inclined with respect to the supporting shaft 14 and a portion of upper and lower opening ends of the supporting hole 18 is caused to be in contact with the outer circumferential surface of the supporting shaft 14. At this time, angular moment (rotation torque) in the direction indicated by arrow M in FIG. 7 is operated (worked) by action of magnetic field produced from the respective magnets 15, 15 with respect to the movable portion 11.

Figure 7:
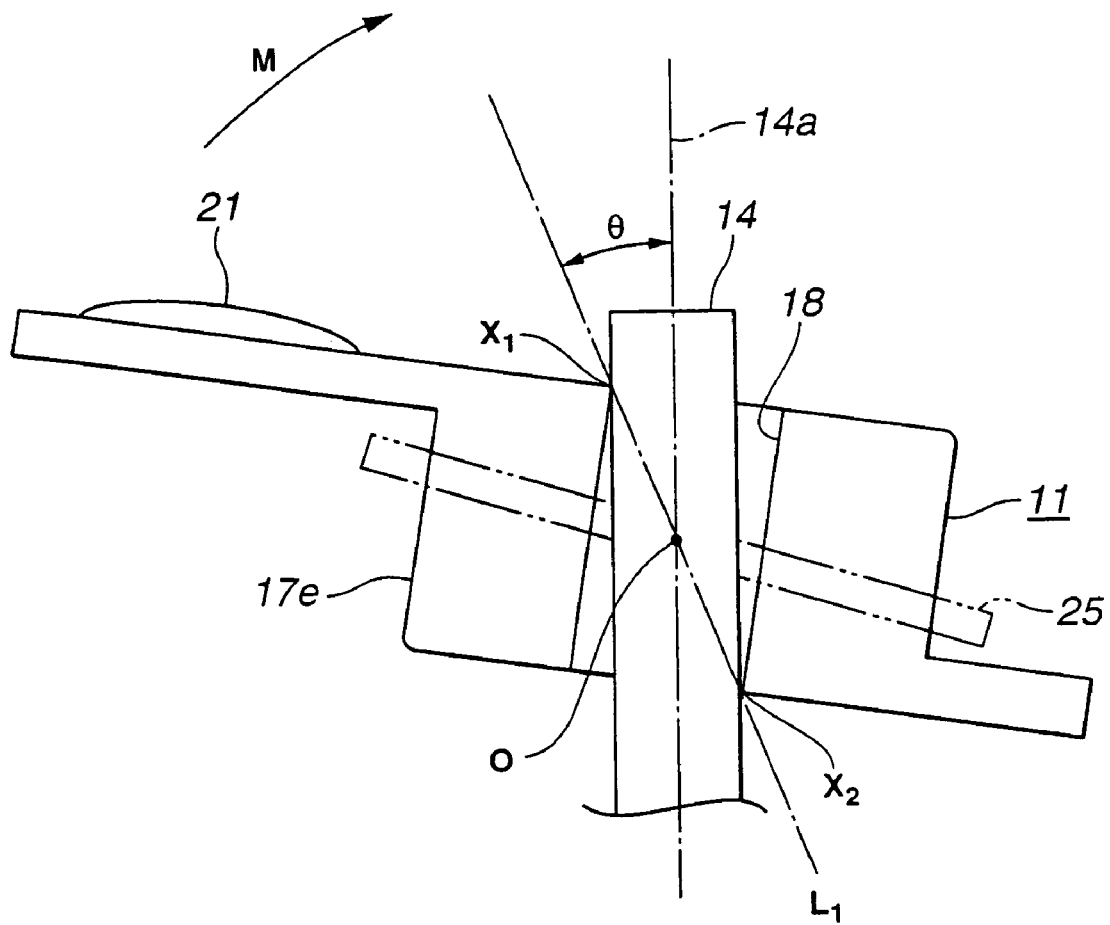
FIG. 7 is a side view showing the state where the movable portion is operated.

The object lens drive device 9 according to the present invention undergoes angular moment in the direction indicated by arrow M in FIG. 7 to move the movable portion 11 placed in the state inclined by angle θ with respect to the supporting shaft 14 in the axial direction of the supporting shaft 14 while it is in the inclined state to carry out focus control, and to rotate the movable portion 11 in the direction about the axis of the supporting shaft 14 to carry out tracking control. Namely, the movable portion 11 is moved in the focusing direction and is rotated in the tracking direction in the state where the supporting shaft 14 is supported by two points of upper and lower opening ends of the supporting hole 18.

Figure 8:
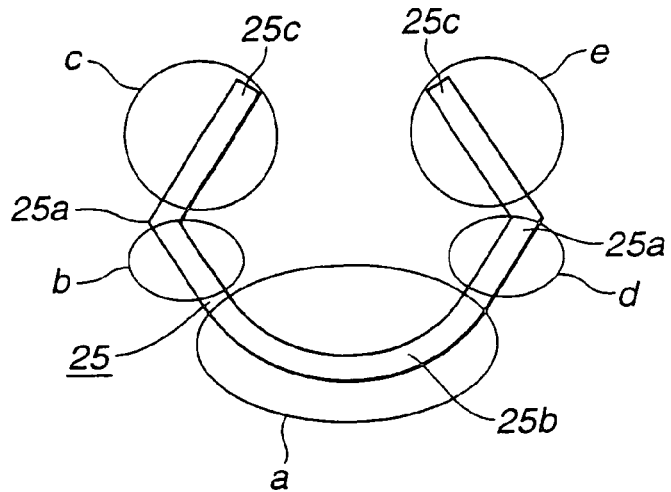
FIG. 8 is a plan view showing magnetic member used in the object lens drive device according to the present invention.

Here, the relationship between inclination angle with respect to the supporting hole 18 provided at the movable portion 11 where the magnetic member 25 is attached of the magnetic member 25 formed to be annular in the state where a portion thereof is opened as described above and angular moment (rotation torque) produced at respective portions of the magnetic member 25 is measured. As shown in FIG. 8, measurements of angular moment were carried out at portion a of the connecting portion 25b of the magnetic member 25, portions b, d in the vicinity of projected portions 25a, 25a of the both sides, and portions c, e of end portions 25c, 25c of the opening side. The result of the measurement thereof is shown in FIG. 9.

Figure 9:
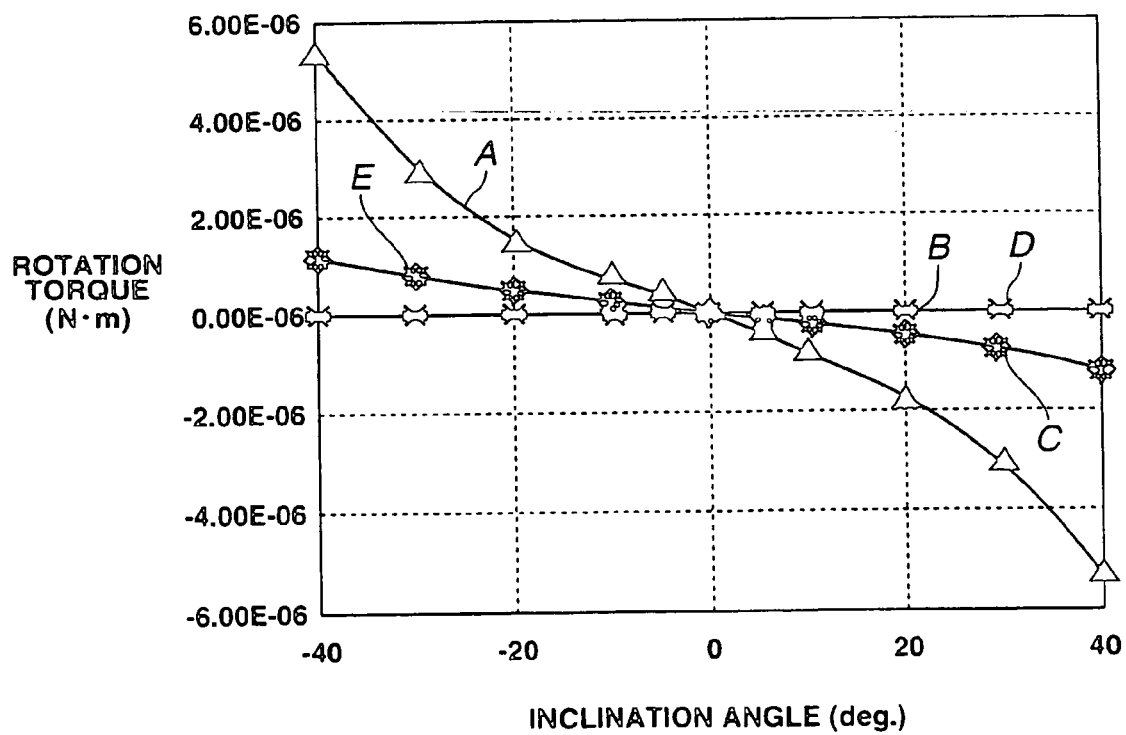
FIG. 9 is a graphic diagram showing the result in which the relationship between inclination angle with respect to supporting hole of magnetic member and produced angular moment (rotation torque) is measured.

In FIG. 9, the abscissa indicates inclination angle θ of center axis 25d of the magnetic member 25 with respect to central axis 18a of the supporting hole 18, wherein plus (+) indicates the state where the connecting portion 25b side is inclined in a manner positioned at the front end side of the supporting shaft 14, and minus (−) indicates the state where the connecting portion 25b side is inclined in a manner positioned at the base end portion side of the supporting shaft 14. The ordinate of FIG. 9 indicates value of angular moment (rotation torque).

As shown in FIG. 9, rotation torque produced at the portion a of the connecting portion 25b indicates the characteristic as indicated by A in FIG. 9, rotation torques produced at the portions b, d in the vicinity of projected portions 25a, 25a of the both sides indicate the characteristics indicated by B, D in the figure, and rotation torques produced at the portions c, e of end portions 25c, 25c of the opening side indicate the characteristics as indicated by C, E in the figure.

From the result of the measurement shown in FIG. 9, it has been understood that it is desirable that inclination angle θ of the magnetic member 25 with respect to the supporting hole 18 is 20° to 40° (also including −20° to −40°) in order that satisfactory slidability of the movable portion 11 with respect to the supporting shaft 14 can be enhanced, and the movable portion 11 can hold the state inclined in a predetermined direction with respect to the supporting shaft 14 at all times.

FIGS. 10 to 12 are graphical diagrams showing the result in which the relationship between position in the focusing direction of the movable portion 11 and inclination angle with respect to the supporting shaft 14 of the movable portion 11 when the movable portion 11 is placed in several installation states is measured. These measurements are carried out in the state where the magnetic member 25 is lowered backwardly with respect to the supporting hole 18, i.e., in the state where the connecting portion 25b side is inclined by 30° in a manner positioned at the front end side of the supporting shaft 14.

Respective measurements are carried out in the following three states. Namely, measurements are carried out in connection with the state of neutral position (Tr=0.0000 mm) where the movable portion 11 is not operated in the tracking direction, the state where the movable portion 11 is rotated by a predetermined quantity in one direction with the supporting shaft 14 being as center from the neutral position so that the optical axis of the object lens 21 is rotated by, e.g., 0.2500 mm from the neutral position, and the state where the movable portion 11 is rotated by a predetermined quantity toward the other direction with the supporting shaft 14 being as center from the neutral position so that the optical axis of the object lens 21 is rotated by, e.g., 0.2500 mm from the neutral position.

The abscissa in FIGS. 10 to 12 indicates position in the focusing direction of the movable portion 11, wherein "0" indicates neutral position, plus (+) indicates the position moved to the front end side of the supporting shaft 14, and minus (−) indicates the position moved to the base end portion side of the supporting shaft 14. Measurement is carried out within the measurement range (from −0.6 mm to 0.6 mm) in the focusing direction of the movable portion 11. The ordinate in the respective figures indicates inclination angle with respect to the supporting shaft 14 of the movable portion 11. With respect to this inclination angle, reference angle when the movable portion 11 is placed at the neutral position is caused to be "0".

P in FIGS. 10 to 12 indicates the characteristic when the movable portion 11 is located at the neutral position, S indicates the characteristic when the movable portion 11 is rotated in one direction with the supporting shaft 14 being as center, and T indicates the characteristic when the movable portion 11 is rotated in the other direction with the supporting shaft 14 being as center.

FIG. 10 is the result in which measurement is carried out in the state where the axial direction of the supporting shaft 14 is vertical direction, FIG. 11 is the result in which measurement is carried out in the state where the axial direction of the supporting shaft 14 is horizontal direction and the object lens 21 is located at the lower portion of the supporting shaft 14, and FIG. 12 is the result in which measurement is carried out in the state where the axial direction of the supporting shaft 14 is horizontal direction and the object lens 21 is located at the side direction of the supporting shaft 14.

FIGS. 13 to 15 are graphical diagrams showing the result in which the relationship between position in the focusing direction of the movable portion 11 and inclination angle with respect to the supporting shaft 14 of the movable portion 11 when movable portion 11 of the configuration similar to the movable portion in the conventional object lens device is placed in several installation states is measured. These measurements are carried out in the state where the magnetic member 25 is not inclined with respect to the supporting hole 18, i.e., an angle that the center axis of the supporting hole 18 and center axis of the magnetic member 25 form is equal to 0°. Similarly to the above-described present invention, these measurements are also carried out in connection with the state of the neutral position where the movable portion 11 is not operated in the tracking direction (Tr=0.0000 mm), the state where the movable portion 11 is rotated by a predetermined quantity in one direction with the supporting shaft 14 being as center from the neutral position so that the optical axis of the object lens 21 is rotated by, e.g., 0.2500 mm from the neutral position, and the state where the movable portion 11 is rotated by a predetermined quantity in the other direction with the supporting shaft 14 being as center from the neutral position so that the optical axis of the object lens 21 is rotated by, e.g., 0.2500 mm from the neutral position.

The abscissa and the ordinate of FIGS. 13 to 15 are the same as those of respective views of FIGS. 10 to 12.

P' in FIGS. 13 to 15 indicates the characteristic when the movable portion 11 is located at the neutral position, S' indicates the characteristic when the movable portion 11 is rotated in one direction with the supporting shaft 14 being as center, and T' indicates the characteristic when the movable portion 11 is rotated in the other direction with the supporting shaft 14 being as center.

As the result of these measurements, in the object lens drive device 9 according to the present invention, it has been confirmed that, as compared to the conventional object lens drive device, there hardly exists change in direction of inclination of the movable portion 11 when the movable portion 11 is operated in the focusing direction, and the movable portion 11 is operated in the state inclined in a predetermined direction at all times with respect to the supporting shaft 14.

As described above, in the object lens drive device 9 according to the present invention, since the magnetic member 25 is attached to the movable portion 11 in the state inclined with respect to the supporting hole 18, the movable portion 11 is operated in the state inclined in a predetermined direction with respect to the supporting shaft 14 at all times. Accordingly, when the movable portion 11 is operated, there is no possibility that change takes place in direction of inclination with respect to the supporting shaft 14 of the movable portion 11 to have ability to ensure the stable operating state of the movable portion 11. Since the movable portion 11 is operated in the state where angular moment in a predetermined direction is produced at all times, it is possible to ensure the stable operating state irrespective of change of attitude of the movable portion 11. Since there is no change in direction of inclination with respect to the supporting shaft 14 of the movable portion 11, it is possible to shorten length of the supporting hole 18. Thus, the object lens drive device 9 caused to be of thin structure can be realized.

In the object lens drive device according to the present invention, the movable portion 11 is inclined in a manner inclined by a predetermined angle θ with respect to the supporting shaft 14, whereby center O of line L, which connects two contact points $X_1$, $X_2$ of two opening edges of the supporting hole 18 of the movable portion 11 and the supporting shaft 14 with which these opening edges are in contact is positioned on center axis 14a of the supporting shaft 14 as shown in FIG. 7. Accordingly, balance of the movable portion 11 with respect to the supporting shaft 14 is satisfactory. Thus, it is possible to satisfactorily maintain the characteristics of the focus control and the tracking control of the object lens drive device 9.

In addition, since annular member in which one end is opened is used as the magnetic member 25, the configuration of the magnetic member is simple, and it is also possible to extremely easily carry out attachment with respect to the supporting cylinder 17e of the movable portion 11.

While the magnetic member 25 is attached to the supporting cylinder 17e in the state where center axis 25d is inclined backwardly with respect to center axis 18a of the supporting hole 18, i.e., in a manner such that connecting portion 25b is positioned at the front end side of the supporting shaft 14 in the movable portion 11 of the above-described object lens drive device 9, the magnetic member 25 may be attached to the supporting cylinder 17e, in a manner opposite to the above, in the state where center axis 25d is inclined forwardly with respect to center axis 18a of the supporting hole 18, i.e., in such a manner that connecting portion 25b is positioned at the base end portion side of the supporting shaft 14.

While magnetic member formed as an annular member where a portion is opened is used as the magnetic member 25, there may be used a magnetic member formed as a closed annular member where a portion is not opened. Even in the case where such magnetic member 25 is used, the upper side portion of the connecting portion 25b side is attracted toward the upper side by action of magnetic field of the magnets 15, 15 constituting magnetic circuit, and the closed portion of the lower side opposite to the connecting portion 25b is attracted toward lower direction. Accordingly, since the magnetic member 25 can undergo angular moment rotated in one direction with respect to the supporting shaft 14, action (function) similar to the above can be realized.

Then, another embodiment of the present invention will be explained with reference to the attached drawings.

An object lens drive device which will be explained below is also used in optical pick-up 7 assembled in the disc drive apparatus 1 constituted as shown in FIG. 1.

The object lens drive device 109 used in this optical pick-up 7 comprises, as shown in FIGS. 16 to 20, a fixed portion 110 formed by magnetic metallic material, and a movable portion 111 supported at this fixed portion 110.

Figure 16:
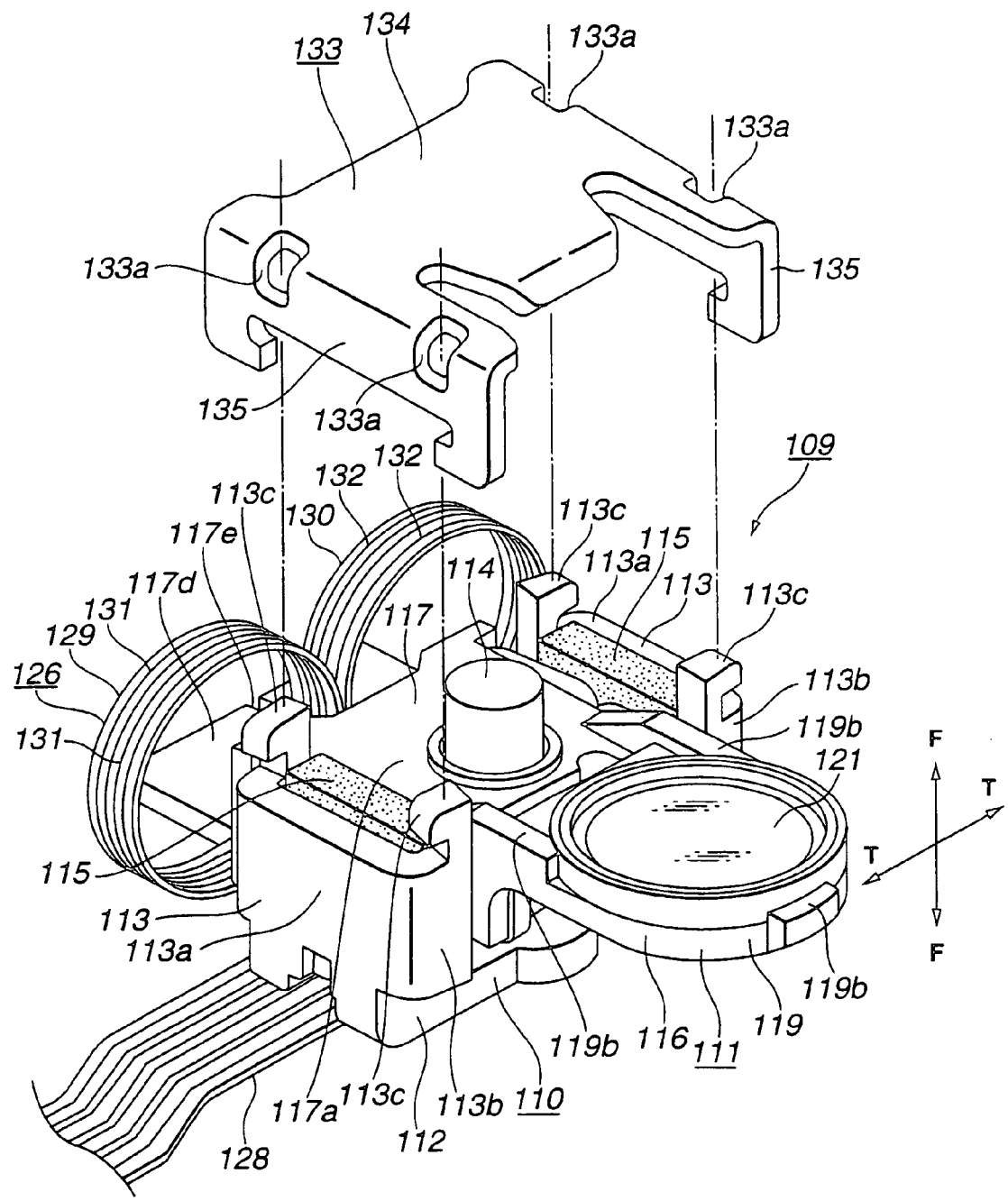
FIG. 16 is a perspective view showing another example of the object lens drive device according to the present invention.
Figure 17:
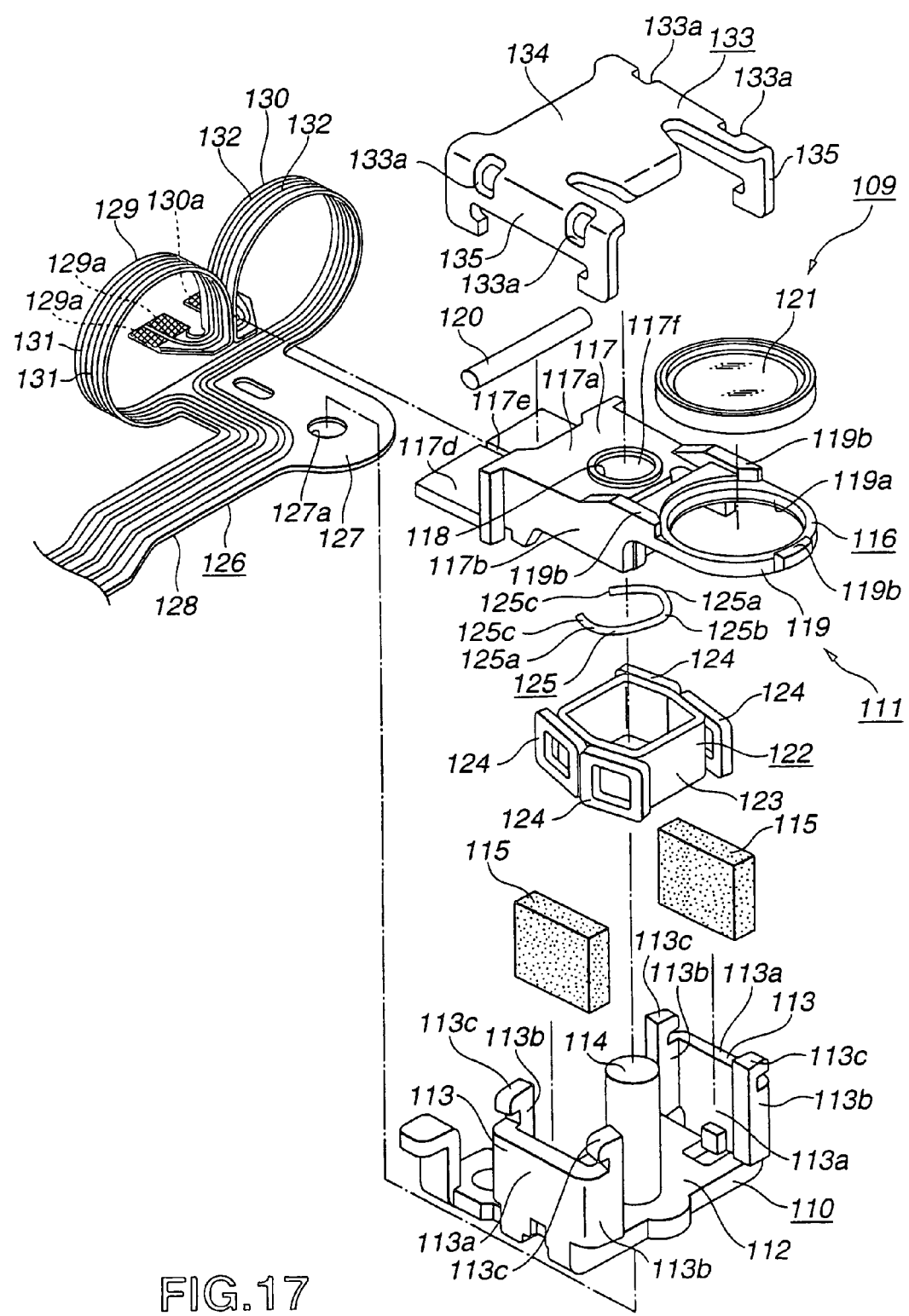
FIG. 17 is an exploded perspective view showing an object lens drive device of another example.

The fixed portion 110 includes, as shown in FIGS. 16 and 17, a base portion 112 attached on the upper surface of a movement base 108, a pair of yoke portions 113, 113 formed in a manner respectively bent toward upper direction from both side edges of this base portion 112, and a supporting shaft 114 projected upwardly from substantially the central portion of the base portion 112.

The yoke portion 113 is comprised of attachment portions 113a, and bent portions 113b, 113b formed in a bent form so as to oppose the inside from both side edges before and after of the attachment portions 113a. At the upper side of these bent portions 113b, 113b, there are formed engagement projected portions 113c, 113c in a projected manner.

At the internal surfaces of the respective yoke portions 113, 113, magnets 115, 115 are respectively fixed. The magnets 115, 115 are adapted so that surfaces of the sides opposite to each other, i.e., surfaces of the sides opposite to the supporting shaft 114 are polarized (magnetized) so that they both have the same pole. The surfaces opposite to each other of the respective magnets 115, 115 are polarized (magnetized) so that they have either S-pole or N-pole. In this example, the surfaces opposite to each other of the respective magnets 115, 115 are polarized (magnetized) so that they have S-pole. At the magnets 115, 115, as shown in FIG. 16, respective surfaces of both sides perpendicular to the surfaces respectively attached to the yoke portions 113, 113 are covered by the pair of bent portions 113b, 113b.

At a bobbin 116 of the movable portion 111, there are attached necessary respective members such as a focusing coil 123 and tracking coils 124, 124, etc.

The bobbin 116 includes, as shown in FIG. 17, a body portion 117 and a lens holder 119 forwardly projected from this body portion 117. The body portion 117 includes an upper surface portion 117a, side surface portions 117b, 117b projected toward the lower direction from both side edges of this upper surface portion 117a, and a backward surface portion 117c projected toward lower direction from the rear edge of the upper surface portion 117a, wherein a base attachment portion 117d is projected toward the backward direction from the lower edge of the backward surface portion 117c (see FIG. 19). At the central portion in left and right directions of the backward end side of the base attachment portion 117d, there is formed a slit 117e for insertion which is opened toward the backward direction. Substantially at the central portion of the upper surface portion 117a, there is provided a cylindrical supporting cylinder 117f projected toward the lower direction (see FIG. 19). The internal space of the supporting cylinder 117f of the body portion 117 is used as a supporting hole 118 of the supporting shaft 114 (see FIG. 19).

At a lens holder 119, there is formed a transmission hole 119a. Plural holding projected portions 119b are provided at the outer periphery.

Figure 19:
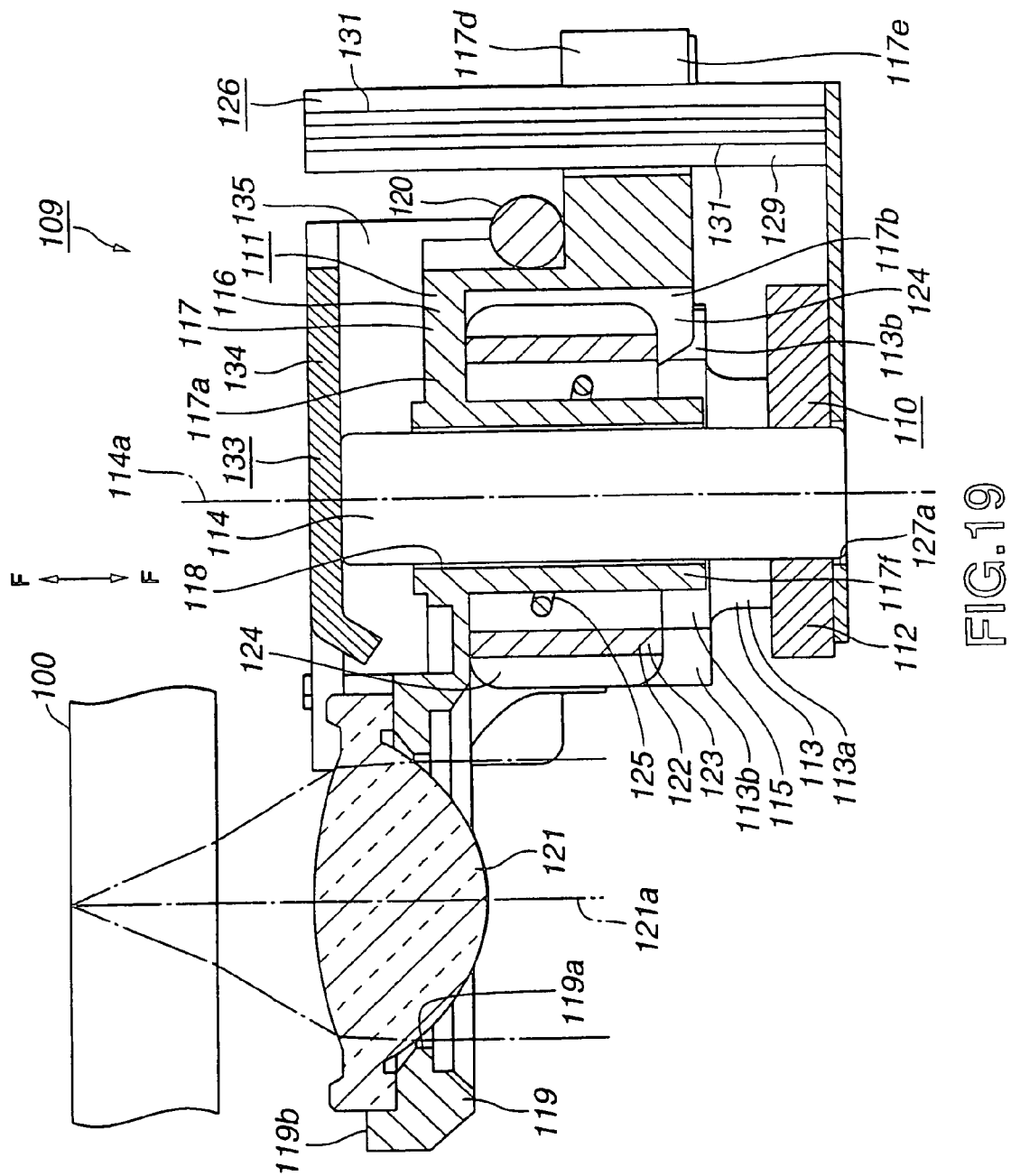
FIG. 19 is a cross sectional view along IXX-IXX line of FIG. 18 shown in the state where cover is attached.
Figure 20:
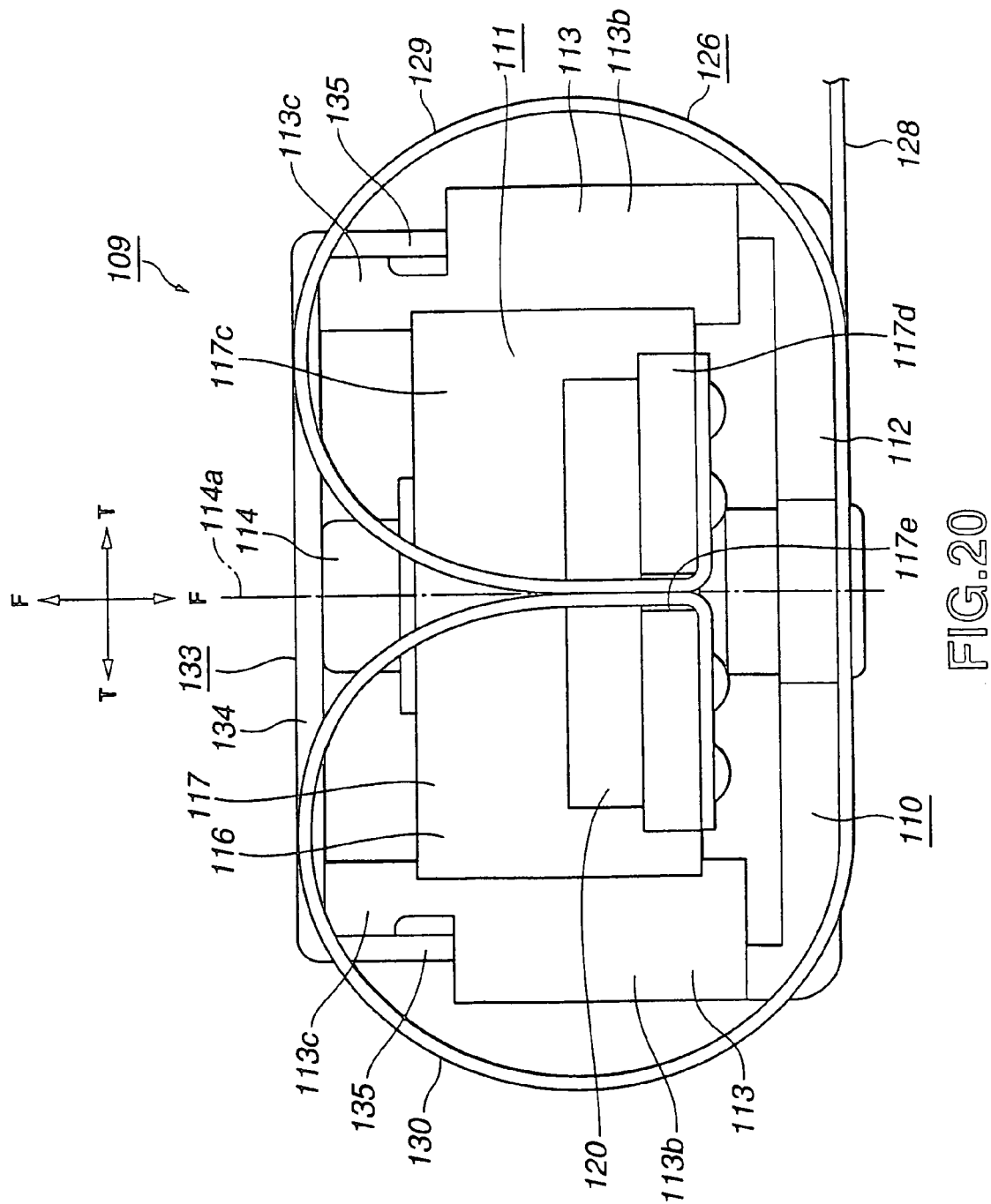
FIG. 20 is a rear surface view of the object lens drive device of another example.

At the base attachment portion 117d of the bobbin 116, as shown in FIGS. 19 and 20, there is attached a round shaft shaped balancer 120.

Figure 18:
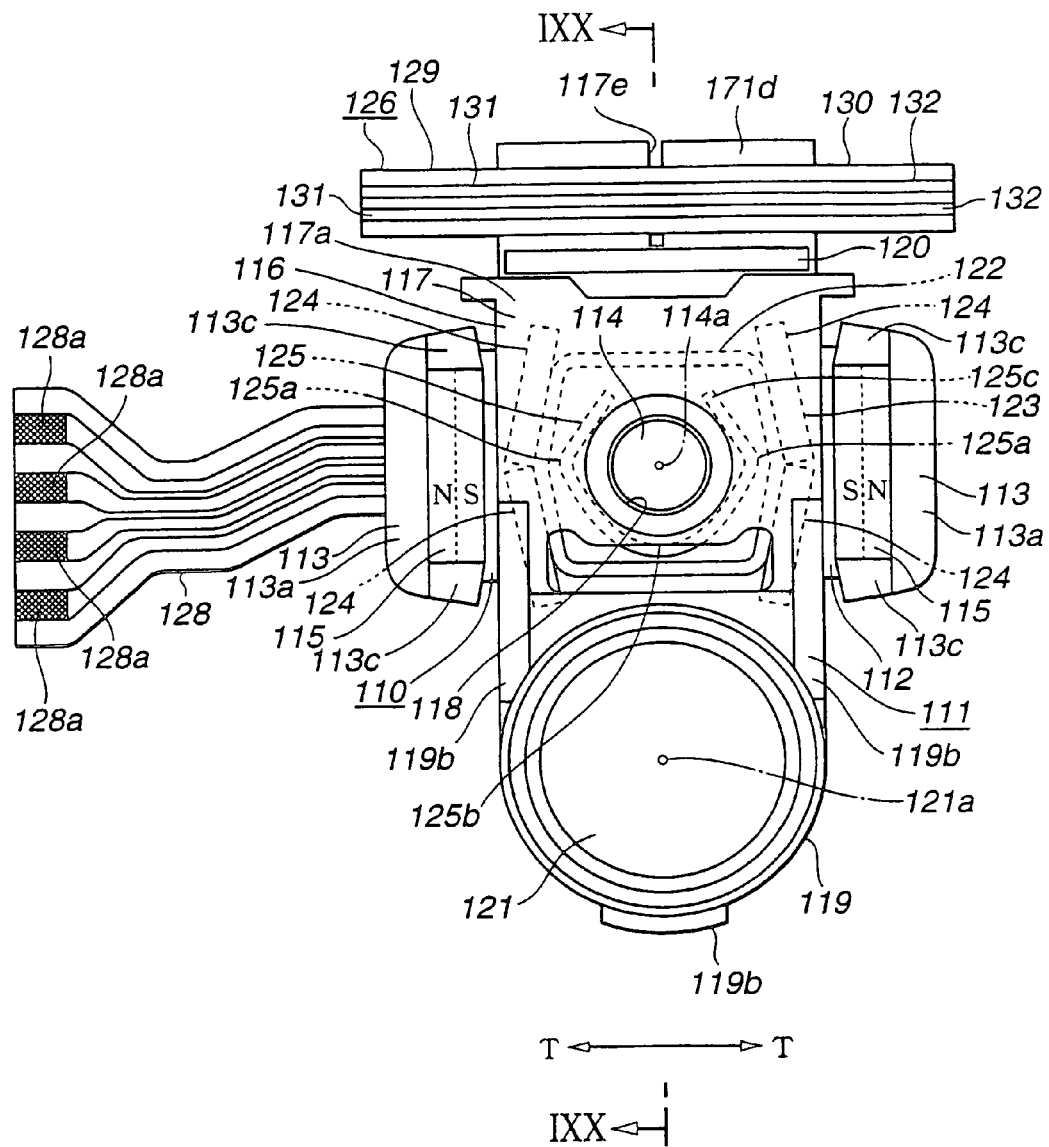
FIG. 18 is a plan view showing the object lens drive device of another example in the state where cover is detached.

At the lens holder 119 provided at the bobbin 116, as shown in FIG. 18, an object lens 121 is held in the state where it is pressed and supported from the periphery at the plural holding projected portions 119b.

At the lower surface of the upper surface portion 117a of the bobbin 116, a coil body 122 is attached (see FIGS. 17 to 19). The coil body 122 comprises the focusing coil 123 wound in substantially rectangular cylindrical form so that the axial direction is caused to be upper and lower directions, and tracking coils 124, 124 by one pair which are attached in the state adjacent to each other and in parallel to each other before and after at side surfaces opposite to each other of this focusing coil 123.

At the supporting cylinder 117f of the bobbin 116, a magnetic member 125 formed to be substantially annular by linear magnetic metallic material is attached (see FIGS. 17 to 19). As shown in FIG. 17, the magnetic member 125 is formed so as to take annular shape in which a portion is opened. Namely, the magnetic member 125 includes a connecting portion 125b curved so as to take semi-circular shape at the central portion, and a pair of end portions 125c, 125c extended from both ends of this connecting portion 125b. The magnetic member 125 is formed to be annular as the result of the fact that end portions 125c, 125c are bent so that they are close to each other and are extended from both ends of the connecting portion 125b. The magnetic member 125 formed to be annular in this way is adapted so that the connecting portion to the connecting portion 125b of the end portions 125c, 125c is caused to be projected portions 125a, 125a bent so as to project toward the both sides. These pair of projected portions 125a, 125a are formed so that they are projected toward the external from circle serving as center of the magnetic member 125 formed to be annular.

As the result of the fact that the supporting shaft 114 is inserted into the supporting hole 118, the movable portion 111 is supported slidably in the axial direction of the supporting shaft 114 and rotatably in the direction about the axis of the supporting shaft 114 (see FIGS. 16, 18 and 19). The axial direction of the supporting shaft 114 is the focusing direction of F-F direction in FIGS. 16, 19 and 20 where position of the object lens 121 is controlled so that light beams irradiated through the object lens 121 are irradiated onto the signal recording surface of the optical disc 100 in the in-focus state, and the direction about the axis of the supporting shaft 114 is the tracking direction of T-T direction in FIGS. 16, 18 and 20 where control is conducted so that light beams irradiated through the object lens 121 follow recording tracks of the optical disc 100.

In the state where the movable portion 111 is supporting by the supporting shaft 114, as shown in FIGS. 16 and 18, the magnets 115, 115 are positioned in a manner close to the outside of respective side surface portions 117b, 117b and opposite thereto of the bobbin 116. In the state where the movable portion 111 is supported by the supporting shaft 114, as shown in FIGS. 17, 19 and 20, a portion of a flexible printed wiring board 126 is attached in a manner bridging over the fixed portion 110 and the movable portion 111.

Figure 21:
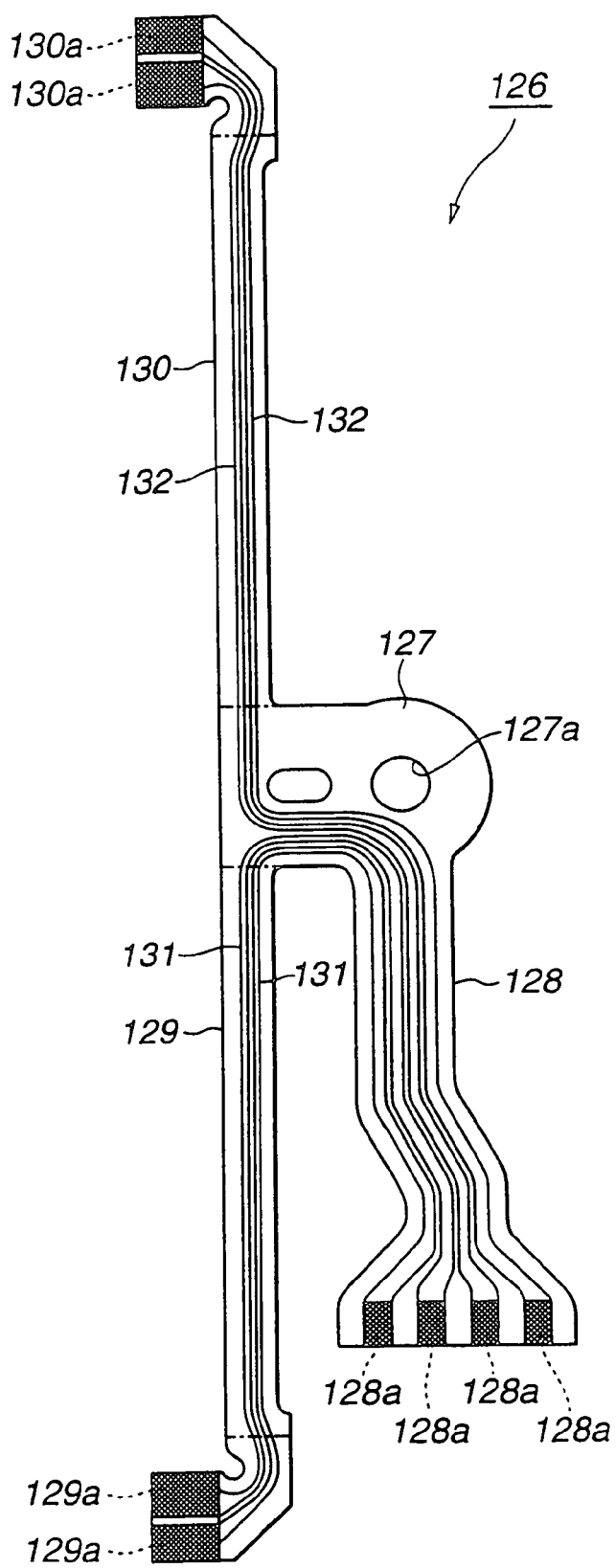
FIG. 21 is a development elevation showing flexible printed wiring board used in the object lens drive device according to the present invention.
Figure 22:
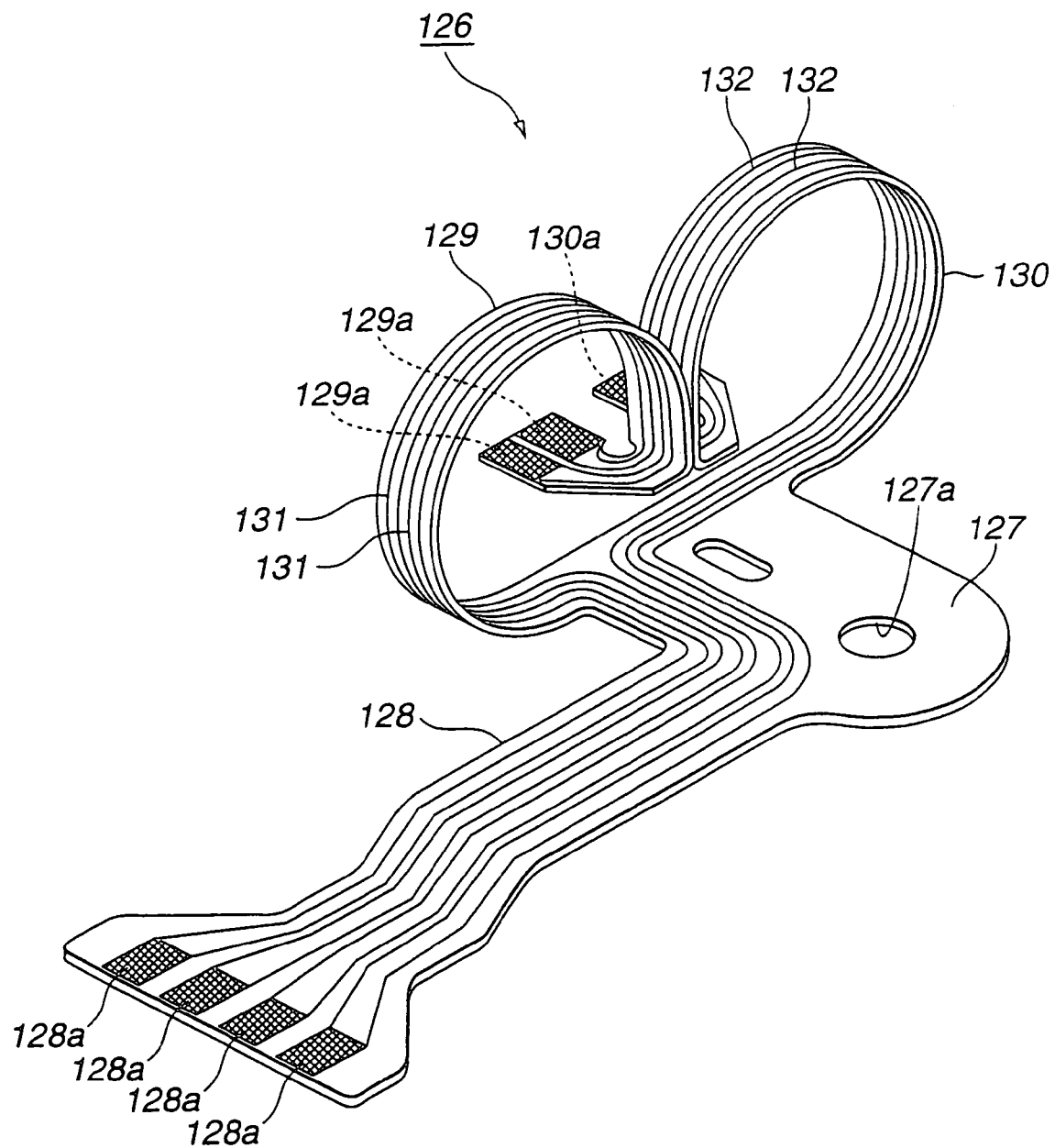
FIG. 22 is a perspective view showing the state where respective portions of flexible printed wiring board are attached to movable portion and fixed portion.

The flexible printed wiring board 126 is adapted so that the base is formed by material having flexibility, and includes, as shown in FIGS. 21 and 22, an attachment portion 127 attached to the fixed portion 110, a derivation portion 128 projected from this attachment portion 127, a first junction portion 129, and a second junction portion 130. At the attachment portion 127, there is formed a hole 127a.

The derivation portion 128 is formed in a manner elongated substantially in a predetermined direction, and is adapted so that four land portions 128a for circuit are provided at the front end portion in a manner spaced from each other when viewed in the developed state as shown in FIG. 21.

When viewed in the developed state as shown in FIG. 21, the first junction portion 129 is formed in such a manner that it is projected from the attachment portion 127 in the state spaced from the derivation portion 128 in the same direction as that of the derivation portion 128, and the front end portion thereof is bent perpendicular to the horizontal direction. At the front end portion of the first junction portion 129, land portions 129a, 129a for coil for carrying out connection to the tracking coil are provided in the state spaced from each other.

When viewed in the developed state as shown in FIG. 21, the second junction portion 130 is formed in such a manner that it is projected from the attachment portion 127 in the direction opposite to the first junction portion 129, and the front end portion thereof is bent perpendicular to the horizontal direction so as to project in the same direction as that of the front end portion of the first junction portion 129. At the front end portion of the second junction portion 130, land portions 130a, 130a for coil for carrying out connection to the focusing coil are provided in the state spaced from each other.

Land portions 129a, 129a to which the tracking coils are connected and land portions 130a, 130a to which the focusing coil is connected are both formed at the lower surface side when viewed in the development elevation shown in FIG. 21.

At the flexible printed wiring board 126, as shown in FIG. 21, there are formed four circuit patterns 131, 131, 132, 132. The circuit patterns 131, 131 are circuit patterns electrically connected to one coil, e.g., tracking coil 124, and are respectively formed between land portions 128a, 128a for circuit and land portions 129a, 129a for coil. Such circuit patterns extend to land portions 129a, 129a for coil via the derivation portion 128, the attachment portion 127 and the first junction portion 129 from land portions 128a, 128a for circuit. The circuit patterns 132, 132 are circuit patterns electrically connected to the other coil, e.g., focusing coil 123, and are respectively formed between land portions 128a, 128a for circuit and land portions 130a, 130a for coil. Such circuit patterns extend to land portions 130a, 130a for coil via the derivation portion 128, the attachment portion 127 and the second junction portion 130 from the land portions 128a, 128a for circuit.

The flexible printed wiring board 126 is attached in such a manner that the first junction portion 129 and the second junction portion 130 bridge over the fixed portion 110 and the movable portion 111 (see FIGS. 16 to 20).

The flexible printed wiring board 126 is adapted so that the attachment portion 127 is attached to the lower surface of the base portion 112 of the fixed portion 110 (see FIGS. 19 and 20). The supporting shaft 114 is slightly projected toward the lower direction from the lower surface of the base portion 112, and the attachment portion 127 is attached to the base portion 112 in the state where the lower end portion of the supporting shaft 114 is inserted into the hole 127. The first junction portion 129 and the second junction portion 130 are adapted so that the portion curved so as to take substantially circular shape and close to the front end is inserted into the slit 117e for insertion of the movable portion 111 in the state in contact therewith, and the portion where the land portions 129a, 129a for coil are formed and the portion where the land portions 130a, 130a for coil are formed are bonded, by, e.g., double-faced tape, at the lower surface of the base attachment portion 117d in the state bent in directions opposite to each other (see FIGS. 19 and 20). At this time, the portion close to the front end of the first junction portion 129 and the second junction portion 130 of the flexible printed wiring board 126 is inserted into the slit 117e for insertion, and the portion where the land portions 129a, 129a for coil are formed and the portion where the land portions 130a, 130a for coil are formed are only bent in directions opposite to each other to have ability to carry out adhesion toward the lower surface of the base attachment portion 117d. For this reason, it is possible to extremely easily carry out attachment with respect to the movable portion 111 of the flexible printed wiring board 126.

In the state where the flexible printed wiring board 126 is attached in this way, both end portions of the tracking coil 124 are respectively connected to the land portions 129a, 129a for coil by soldering, and both end portions of the focusing coil 123 are respectively connected to the land portions 130a, 130a for coil by soldering.

In the state where the flexible printed wiring board 126 is attached to the base attachment portion 117d, the land portions 129a, 129a for coil to which the tracking coils are connected and the land portions 130a, 130a for coil for focusing coil are both directed to the base portion 112 side. For this reason, it is possible to easily solder both end portions of the tracking coil 124 and both end portions of the focusing coil 123 with respect to land portions 129a, 129a for coil.

As shown in FIGS. 16 and 18, the derivation portion 128 of the flexible printed wiring board 126 is projected toward the side direction from the fixed portion 110, and the land portions 128a for circuit are respectively connected to respective terminal portions of current supply circuit.

The flexible printed wiring board 126 attached as described above is disposed so that width directions of the first junction portion 129 and the second junction portion 130 are perpendicular to the focusing direction, and are perpendicular to the tracking direction (see FIGS. 16, 18, 19 and 20). The first junction portion 129 and the second junction portion 130 of the flexible printed wiring board 126 are symmetrically disposed with the plane surface including optical axis 121a of the object lens 121 and central axis 114a of the supporting shaft 114 being as reference (see FIGS. 18 to 20).

At the fixed portion 110, a cover 133 which covers the movable portion 111 is attached (see FIGS. 16, 17 and 19). The cover 133 is adapted so that a top plate 134 and side plates 135, 135 projected toward lower direction from left and right both side edges of the top plate 134 are integrally formed by magnetic metallic material, and plural engagement holes 133a are formed in a manner spaced before and after at the continuous portion of the top plate 134 and the side plate portions 135, 135. The cover 133 is attached to the fixed portion 110 as the result of the fact that engagement projected portions 113c provided at the fixed portion 110 are respectively engaged with the respective engagement holes 133a (see FIG. 16).

Then, explanation will be given in connection with the operation in which the optical disc 100 is loaded with respect to the disc drive unit 1 using the above-described object lens drive device 109 to carry out recording or reproduction of information signals.

In order to record information signals onto the optical disc 100 or to carry out reproduction of information signals recorded on the optical disc 100, the optical disc 100 is loaded with respect to the disc table 4. At the time point when the optical disc 100 is loaded with respect to the disc table 4, recording switch or reproduction switch (not shown) is operated. When the recording switch or the reproduction switch is operated, the spindle motor is driven. Thus, the disc table 4 is rotated in one body with the optical disc 100. When the optical disc 100 is rotated, light beams are emitted from light emitting element like semiconductor laser provided at the movement base 8, and are irradiated onto the signal recording surface of the optical disc 100 through the object lens 121.

The light beams irradiated onto the signal recording surface of the optical disc 100 are reflected by the signal recording surface, and are incident on light receiving element provided at the movement base 8. The light beams thus incident are caused to undergo photo-electric conversion. Thus, recording or reproduction of information signals is carried out.

When recording or reproduction of information signals is carried out, light beams are irradiated onto the signal recording surface of the optical disc 100 in the in-focus state. Thus, focusing control and tracking control of the object lens 121 are carried out by the object lens drive device 109 so as to follow recording tracks. At the time of focusing control, the movable portion 111 is slid in the axial direction of the supporting shaft 114 so that beam spot of light beams irradiated through the object lens 121 is irradiated onto the recording surface of the optical disc 100 in the in-focus state. At the time of tracking control, the movable portion 111 is rotated in the direction about the axis of the supporting shaft 114 so that beam spot of light beams irradiated through the object lens 121 is caused to be in-focus state on recording tracks of the optical disc 100.

In the inoperative state where the movable portion 111 is not driven both in the focusing direction and in the tracking direction, it is held at the neutral position in the focusing direction and in the tracking direction. Namely, in the inoperative state, as the result of the fact that respective projected portions 125a, 125a closest to the respective magnets 115, 115 projected toward both sides of the magnetic member 125 fitted and arranged at the supporting cylinder 117f are attracted by the respective magnets 115, 115, the movable portion 111 is held at the neutral position in the tracking direction. Further, the magnetic member 125 is attached in the state inclined by a predetermined angle θ with respect to the supporting cylinder 117f in such a manner that the connecting portion 125b is positioned at the front end side of the supporting shaft 114, whereby the connecting portion 125b is attracted toward the cover 133 side by action of magnetic field produced from the respective magnets 115, 115, and end portions 125c, 125c of the opening side are attracted toward the base portion 112 side. Thus, the connecting portion 125b is held in the state rotated toward the cover 133 side. Namely, the movable portion 111 is inclined with respect to the supporting shaft 114, and is held at the neutral position in the focusing direction supported in the state where a portion of upper and lower opening ends of the supporting hole 118 is caused to be in contact with the outer circumferential surface of the supporting shaft 114.

As described above, the object lens drive device 109 of this example is disposed in such a manner that width direction of the first junction portion 129 and the second junction portion 130 of the flexible printed wiring board 126 is perpendicular to the focusing direction and is perpendicular to the tracking direction. When the movable portion 111 is respectively moved and rotated in the focusing direction of the axial direction of the supporting shaft 114 and in the tracking direction of the direction about the axis of the supporting shaft 114, load with respect to the movable portion 111 by rigidity of the flexible printed wiring board 126 is small so that improvement in the sensitivity of the movable portion 111 is realized. As a result, precise focus control corresponding to focus error signal is realized. Further, precise tracking control corresponding to tracking error signal is realized.

It is unnecessary to elongate length of the flexible printed wiring board 126 in order to lessen load with respect to the movable portion 111 by the flexible printed wiring board 126. Miniaturization of the object lens drive device 109 can be realized accordingly.

Since the first junction portion 129 and the second junction portion 130 of the flexible printed wiring board 126 are symmetrically disposed with the plane surface including optical axis 121a of the object lens 121 and center axis 114a of the supporting shaft 114 being as center, it is possible to stably hold the movable portion 111 at the neutral position in the tracking direction.

In the object lens drive device 109 of this example, at the first junction portion 129 and the second junction portion 130 of the flexible printed wiring board 126, there are respectively separately formed circuit patterns 131, 131 in which drive current corresponding to tracking error signal is delivered at the time of tracking control, and circuit patterns 132, 132 in which drive current corresponding to focus error signal is delivered at the time of focusing control. For this reason, in the first junction portion 129 and the second junction portion 130, it is possible to mutually lessen influence of noise.

Here, response characteristic when the movable portions where object lenses of the object lens drive device 109 of this example and the object lens drive device preceding to the present invention are attached are caused to undergo movement displacement in the focusing direction and in the tracking direction will be considered in a comparative manner.

Figure 23:
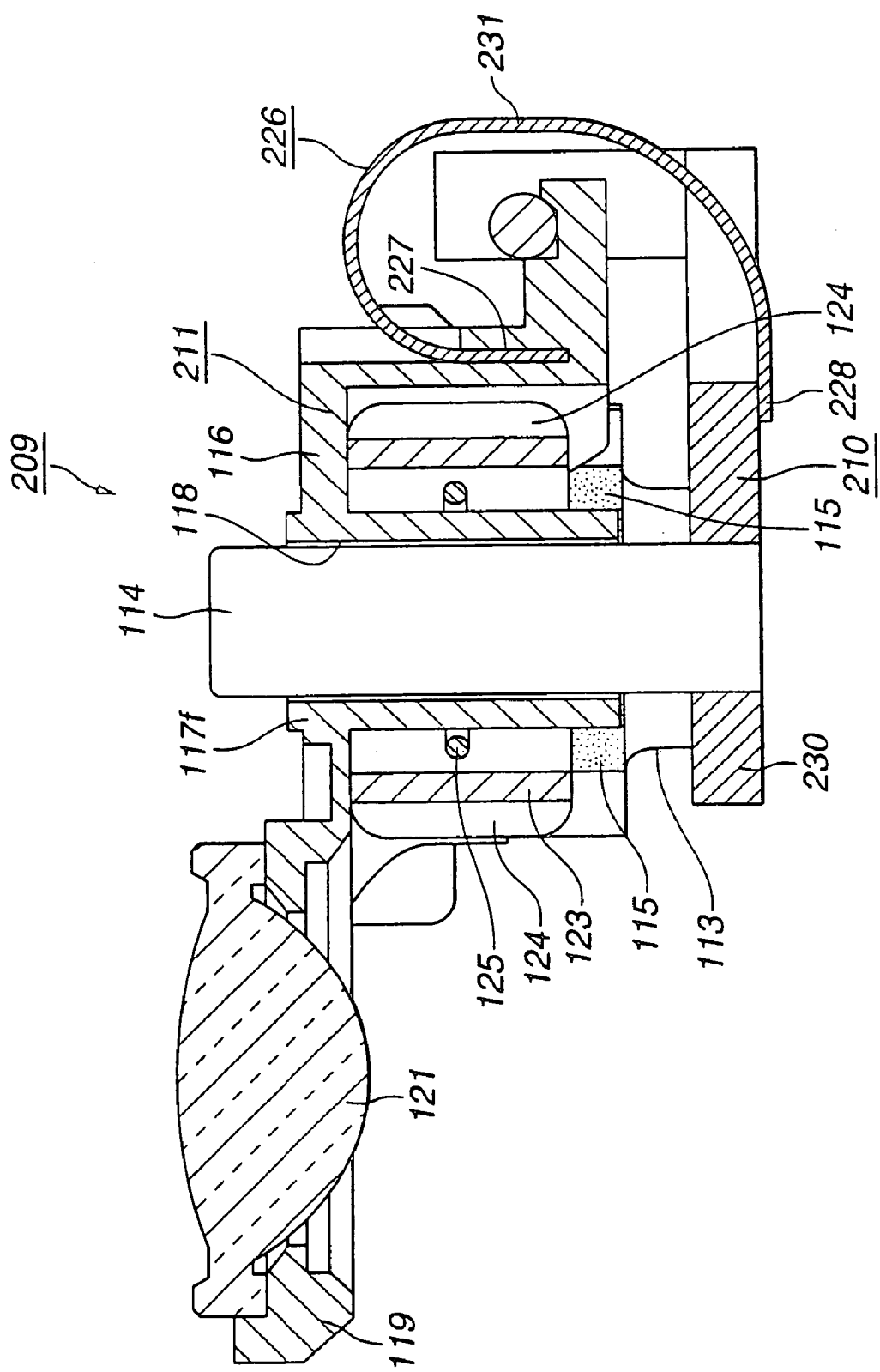
FIG. 23 is a cross sectional view showing object lens drive device compared to the object lens drive device according to the present invention.

Here, an object lens drive device 209 compared to the object lens drive device 109 according to the present invention is constituted as shown in FIG. 23. It is to be noted that common reference numerals are respectively attached to the portions common to the object lens drive deice 109 of the present invention, and the detailed explanation will be omitted.

In the object lens drive device 209 compared to the object lens drive device 109 of the present invention, as shown in FIG. 23, a flexible printed wiring board 226 which electrically connects a fixed portion 210 and a movable portion 211 is adapted so that one end portion 227 is attached to the backward surface portion of bobbin 116 constituting the movable portion 211 in the state where the movable portion 211 is supported by supporting shaft 114, and an intermediate portion 228 of the flexible printed wiring board 226 is attached to the lower surface of an attachment portion 230 of the fixed portion 210. The other end portion (not shown) of the flexible printed wiring board 226 is connected to current supply circuit (not shown). The flexible printed wiring board 226 is disposed in the curved state so that width direction of a junction portion 231, serving as the portion which connects the fixed portion 210 and the movable portion 211 is caused to be in correspondence with the tracking direction.

One end portion 227 of the flexible printed wiring board 226 attached to the bobbin 116 is electrically connected to the focusing coil 123 and the tracking coils 124, and currents are respectively delivered from current supply circuit to the focusing coil 123 and the tracking coils 124 through the flexible printed wiring board 226.

The object lens drive device 209 shown in FIG. 23 is attached to the fixed portion 210 and the movable portion 211 in such a manner that width direction of a junction portion 231 of the flexible printed wiring board 226 is caused to be in correspondence with the tracking direction where the movable portion 211 is rotated in the direction about the periphery of the supporting shaft 114. Accordingly, when the movable portion 211 is operated in the tracking direction, large load is apt to be applied to the movable portion 211 by rigidity of the flexible printed wiring board 226, and there is the possibility that obstacle may take place particularly in the operation in the tracking direction of the movable portion 211.

In this example, annular magnetic member 125 is attached in the horizontal direction perpendicular to the axial direction of the supporting shaft 114.

Figure 24:
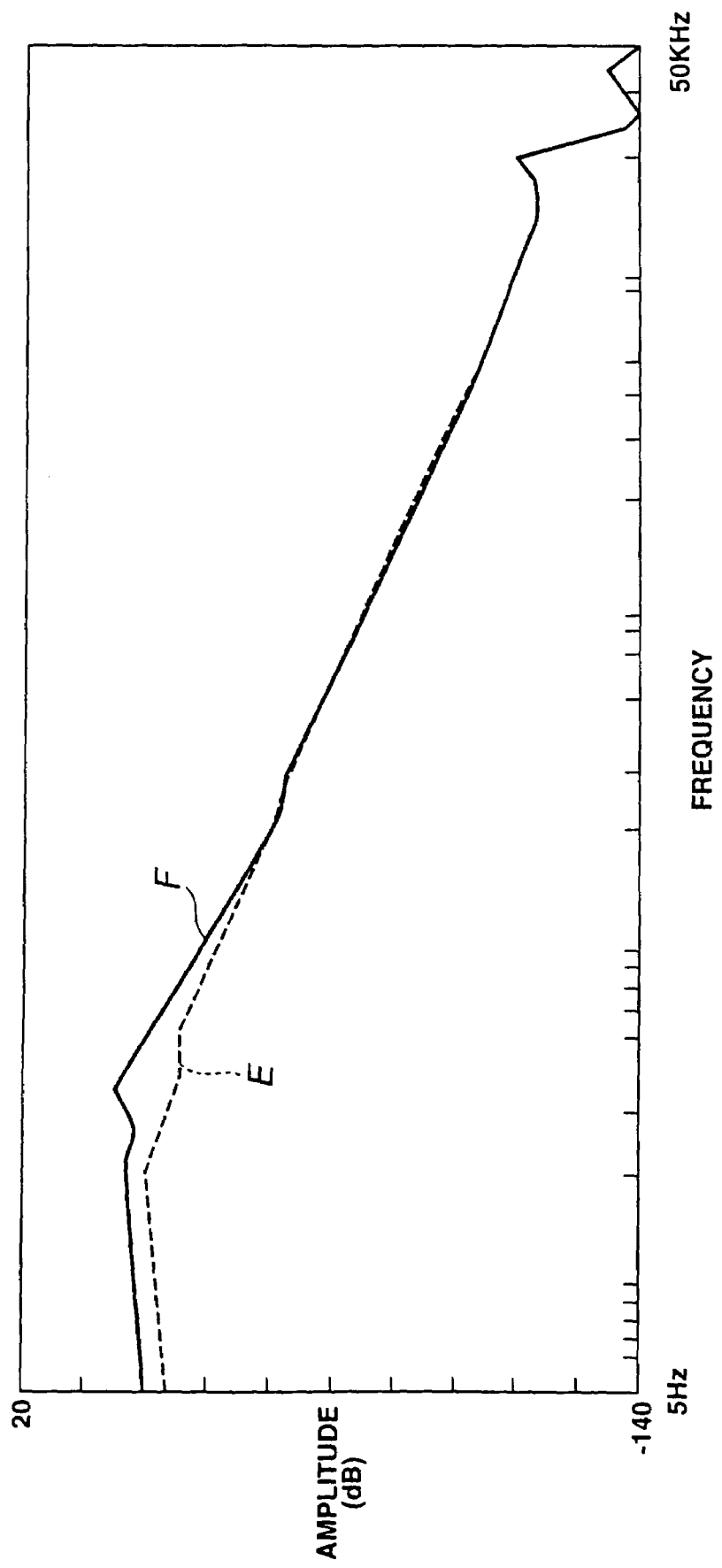
FIG. 24 is a graph showing frequency response (the relationship between amplitude and frequency) when movable portion is operated in the focusing direction.

FIG. 24 is a graph indicating frequency response particularly the relationship between amplitude (gain) and frequency when the movable portion 211 or the movable portion 111 is operated in the focusing direction with respect to the object lens drive device 209 shown in FIG. 23 and the object lens drive device 109 according to the present invention. E in FIG. 24 is measured value with respect to the object lens drive device 209 shown in FIG. 23, and F in FIG. 24 is measured value with respect to the object lens drive device 109 according to the present invention.

Figure 25:
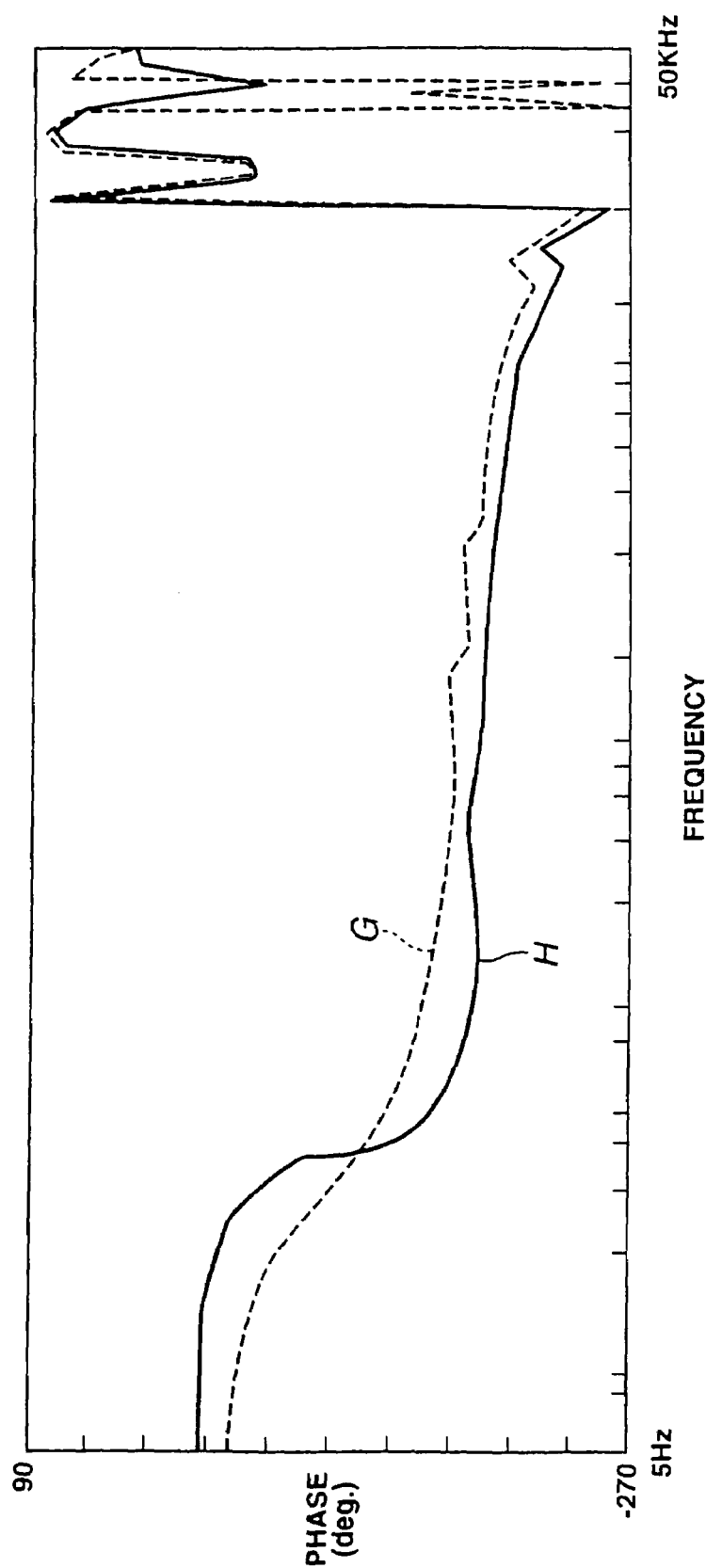
FIG. 25 is a graph showing frequency response (the relationship between phase and frequency) when movable portion is operated in focusing direction.

FIG. 25 is a graph showing frequency response, particularly the relationship between phase and frequency when the movable portion 211 or the movable portion 111 is operated in the focusing direction with respect to the object lens drive device 209 shown in FIG. 23 and the object lens drive device 109 according to the present invention. G in FIG. 25 is measured value with respect to the object lens drive device 209 shown in FIG. 23, and H in FIG. 25 is measured value with respect to the object lens drive device 109 according to the present invention.

As the result of the measurement, in the relationship between amplitude and frequency, as shown in FIG. 24, in the object lens drive device 209 shown in FIG. 23 and the object lens drive device 109 according to the present invention, large difference could not be observed. However, in the relationship between phase and frequency shown in FIG. 25, there was the result that, in the lower frequency region, the frequency region indicating inverting of phase is broad in the object lens drive device 209 shown in FIG. 23, but the frequency region indicating inverting of phase is narrow in the object lens drive device 209 according to the present invention. This is because, in the object lens drive device 209 shown in FIG. 23, since one end portion 227 of the flexible printed wiring board 226 is attached to the backward surface portion of the bobbin 116, a force which presses toward the supporting shaft 114 from the backward direction is rendered from the flexible printed wiring board 226 with respect to the movable portion 211 so that the movable portion 211 is operated in the state caused to be linearly in contact with the supporting shaft 114, and sliding loss is therefore large, but in the object lens drive device 209 according to the present invention, since the front end portion of the first junction portion 129 and the front end portion of the second junction portion 130 of the flexible printed wiring board 126 are attached to the lower surface of the base attachment portion 117d, a rotational force with the axis extending in the focusing direction being as center is rendered from the flexible printed wiring board 126 with respect to the movable portion 111 so that the movable portion 111 is inclined by clearance between the supporting hole 118 and the supporting shaft 114 with respect to the supporting shaft 114, it is moved in the point-contact state, and sliding loss is therefore small.

Accordingly, in the object lens drive device 209 according to the present invention, it has been confirmed that the movable portion 111 is operated in the focusing direction in the state where satisfactory sliding ability is ensured.

Figure 26:
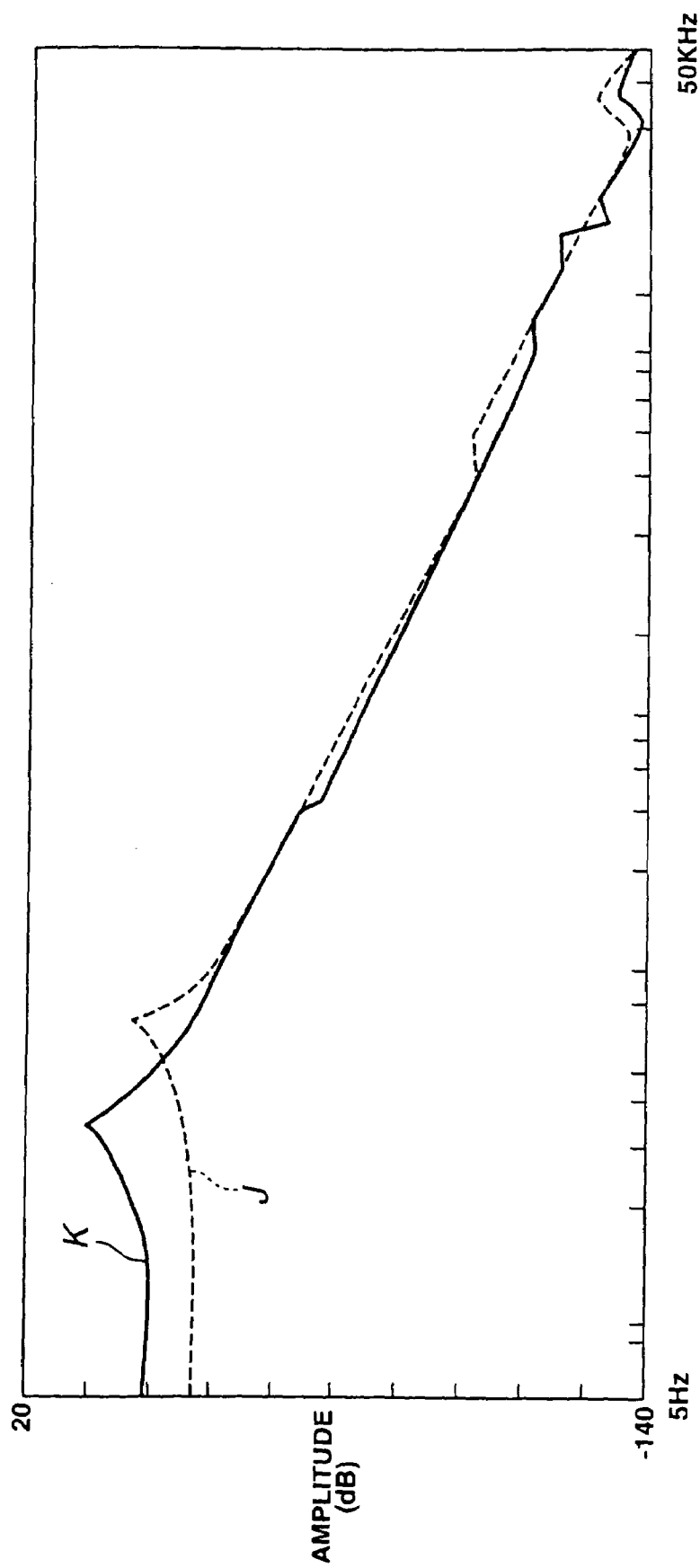
FIG. 26 is a graph showing frequency response (the relationship between amplitude and frequency) when the movable portion is operated in tracking direction.

FIG. 26 is a graph indicating frequency response, particularly the relationship between amplitude (gain) and frequency when the movable portion 211 or the movable portion 111 is operated in the tracking direction with respect to the object lens drive device 209 shown in FIG. 23 and the object lens drive device 109 according to the present invention. J in FIG. 26 is measured value with respect to the object lens drive device 209 shown in FIG. 23, and K in FIG. 26 is measured value with respect to the object lens drive device 109 according to the present invention.

Figure 27:
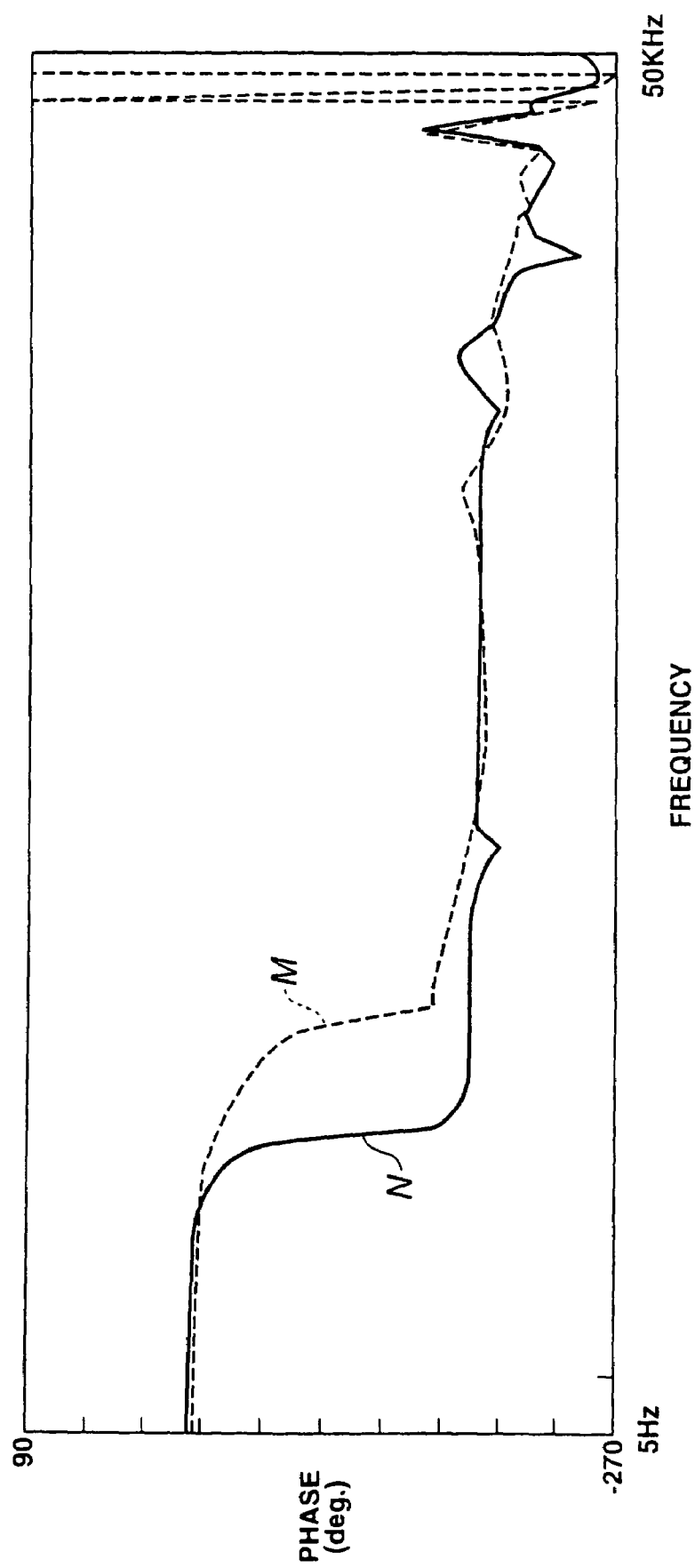
FIG. 27 is a graph showing frequency response (the relationship between phase and frequency) when movable portion is operated in tracking direction.

FIG. 27 is a graph indicating frequency response, particularly the relationship between phase and frequency when the movable portion 211 or the movable portion 111 is operated in the focusing direction with respect to the object lens drive device 209 shown in FIG. 23 and the object lens drive device 109 according to the present invention. M in FIG. 27 is measured value with respect to the object lens drive device 209 shown in FIG. 23, and N in FIG. 27 is measured value with respect to the object lens drive device 109 according to the present invention.

As the result of the measurement, in the object lens drive device 209 shown in FIG. 23 and the object lens drive device 109 according to the present invention, as shown in FIG. 27, the frequency region indicating inverting of phase is only shifted so that large difference could not be observed. However, as shown in FIG. 26, there was obtained the result that, in the relationship between amplitude and frequency, in the lower frequency region, level of gain is low in the object lens drive device 209 shown in FIG. 23, but level of gain is high in the object lens drive device 109 according to the present invention. This is because, in the object lens drive device 209 shown in FIG. 23, load by rigidity of the flexible printed wiring board 226 with respect to the movable portion 211 is large when the movable portion 211 is operated in the tracking direction, but, in the object lens drive device 109 according to the present invention, load by rigidity of the flexible printed wiring board 126 with respect to the movable portion 111 is small when the movable portion 111 is operated in the tracking direction.

In the object lens drive device 109 according to the present invention, it has been confirmed that the movable portion 111 is operated in the tracking direction in the state where load by rigidity of the flexible printed wiring board 126 with respect to the movable portion 111 is small.

Then, explanation will be given in connection with the relationship between the magnetic member 125 for holding the movable portion 111 at the neutral position in the focusing direction and in the tracking direction and the flexible printed wiring board 126 (see FIGS. 28 to 30).

Figure 28:
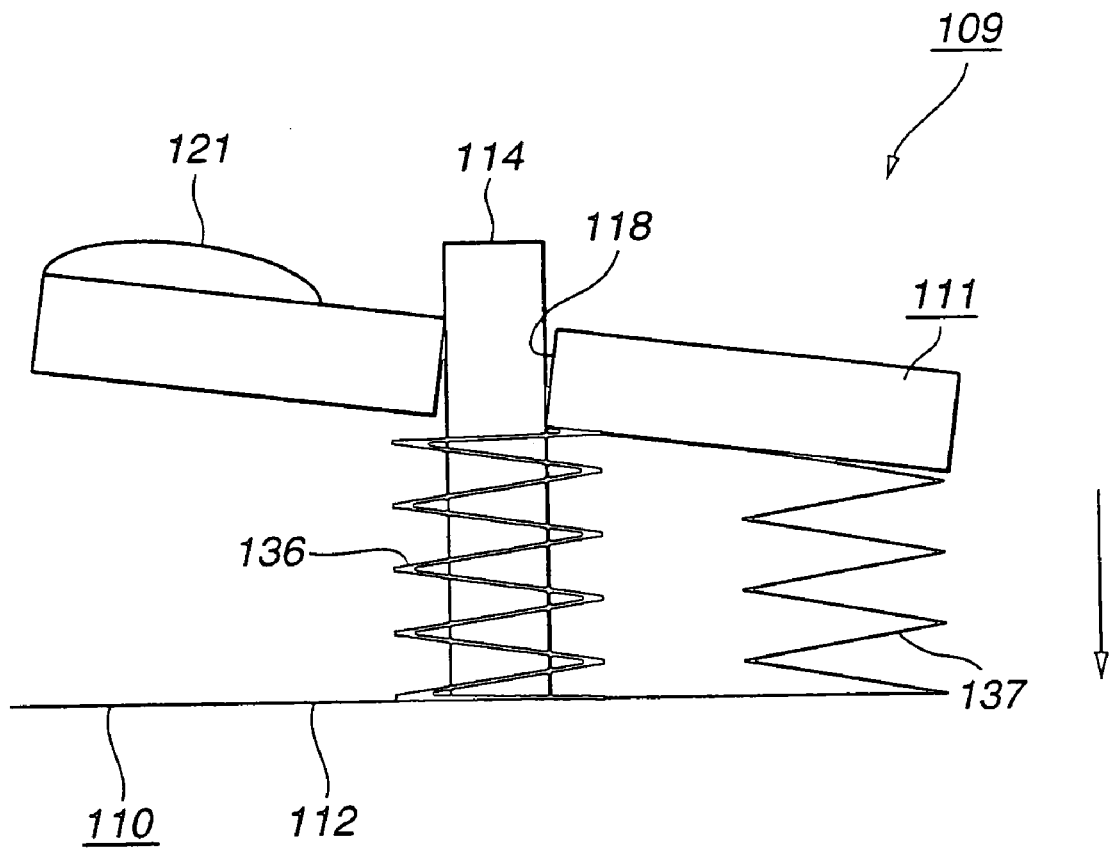
FIG. 28 is a conceptual view for explaining the relationship between magnetic member and flexible printed wiring board, and showing the state where the movable portion is held at the neutral position in focusing direction.
Figure 29:
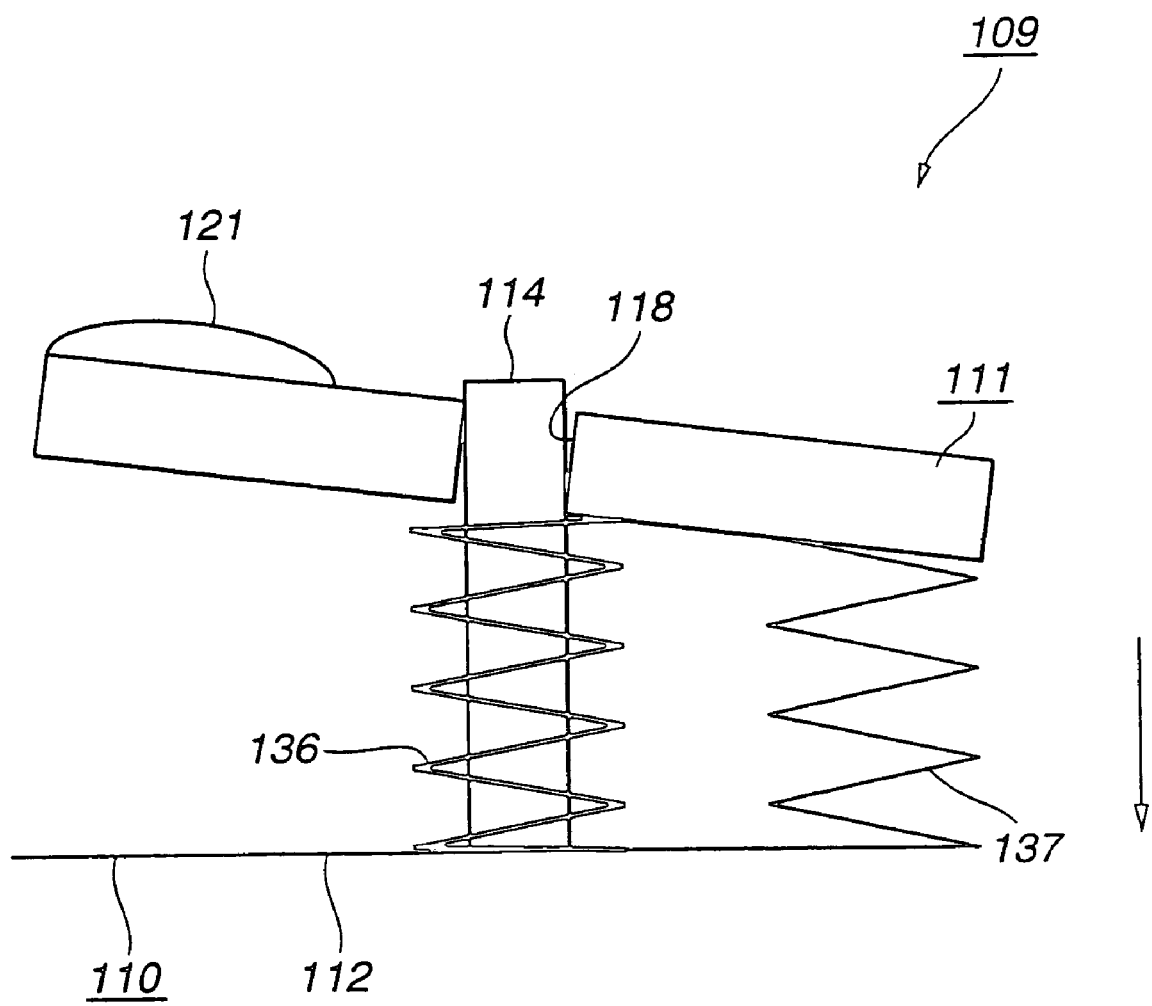
FIG. 29 is a conceptual view showing the state where the movable portion is moved to one movement end in focusing direction.
Figure 30:
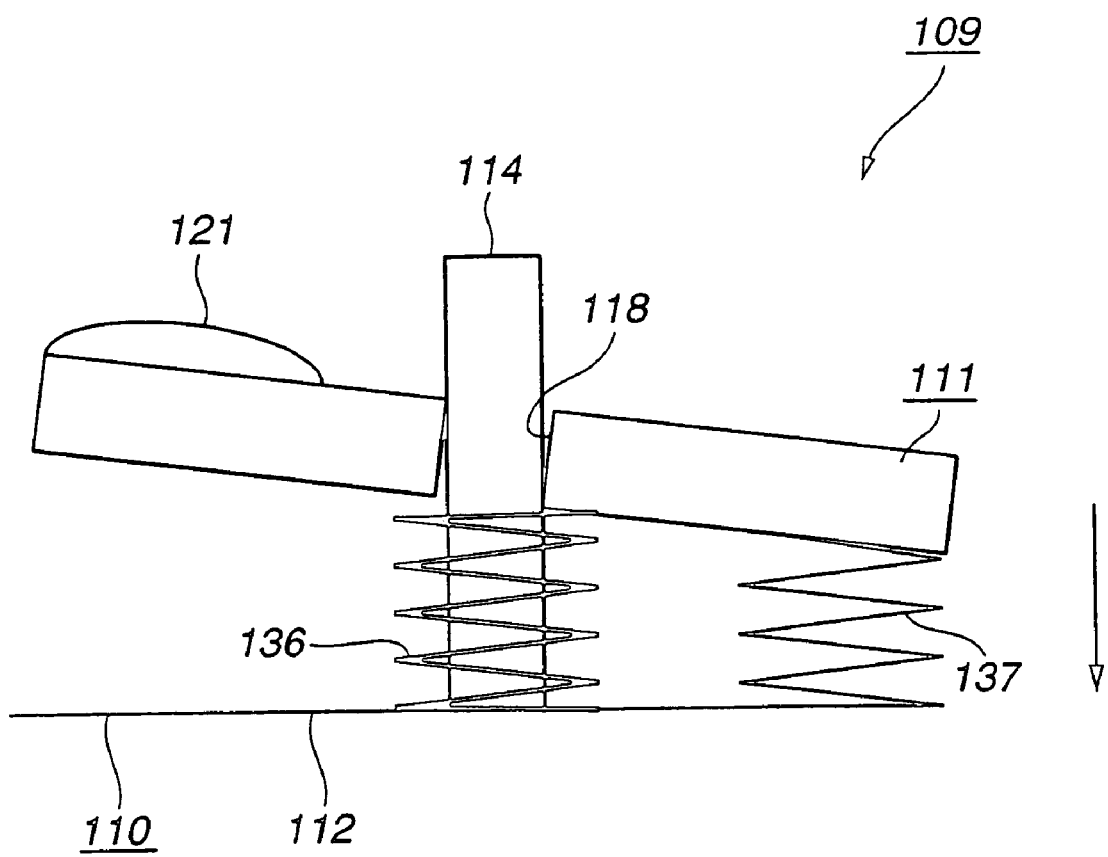
FIG. 30 is a conceptual view showing the state where movable portion is moved to the other movement end in focusing direction.

In FIGS. 28 to 30, for the purpose of conceptually explaining a force which moves movable portion 111 by magnetic member 125 attracted toward magnets 115, 115 disposed at the fixed portion 110 side to the neutral position in the focusing direction, a spring 136 is indicated, and for the purpose of conceptually explaining a force which moves the movable portion 111 to the balance position by elastic force of the flexible printed wiring board 126, a spring 137 is indicated. When it is assumed that force by the magnetic member 125 does not take place, balance position of the movable portion 111 is the position where the movable portion 111 is held by balance between self-weight and elastic force of the flexible printed wiring board 126.

In the object lens drive device 109, since there exists clearance between the supporting hole 118 formed at the movable portion 111 and the supporting shaft 114, the movable portion 111 is placed in the state where it can be inclined in an arbitrary direction by clearance with respect to the supporting shaft 114. However, when this inclination direction is changed during the operation of the movable portion 111, bad influence takes place in the focusing control and the tracking control by the object lens drive device 109. In the object lens drive device 109 according to the present invention, it is desirable that change does not take place in the inclination direction during the operation of the movable portion 111 so that the movable portion 111 is operated in the state inclined in a predetermined direction at all times with respect to the supporting shaft 114.

Figure 31:
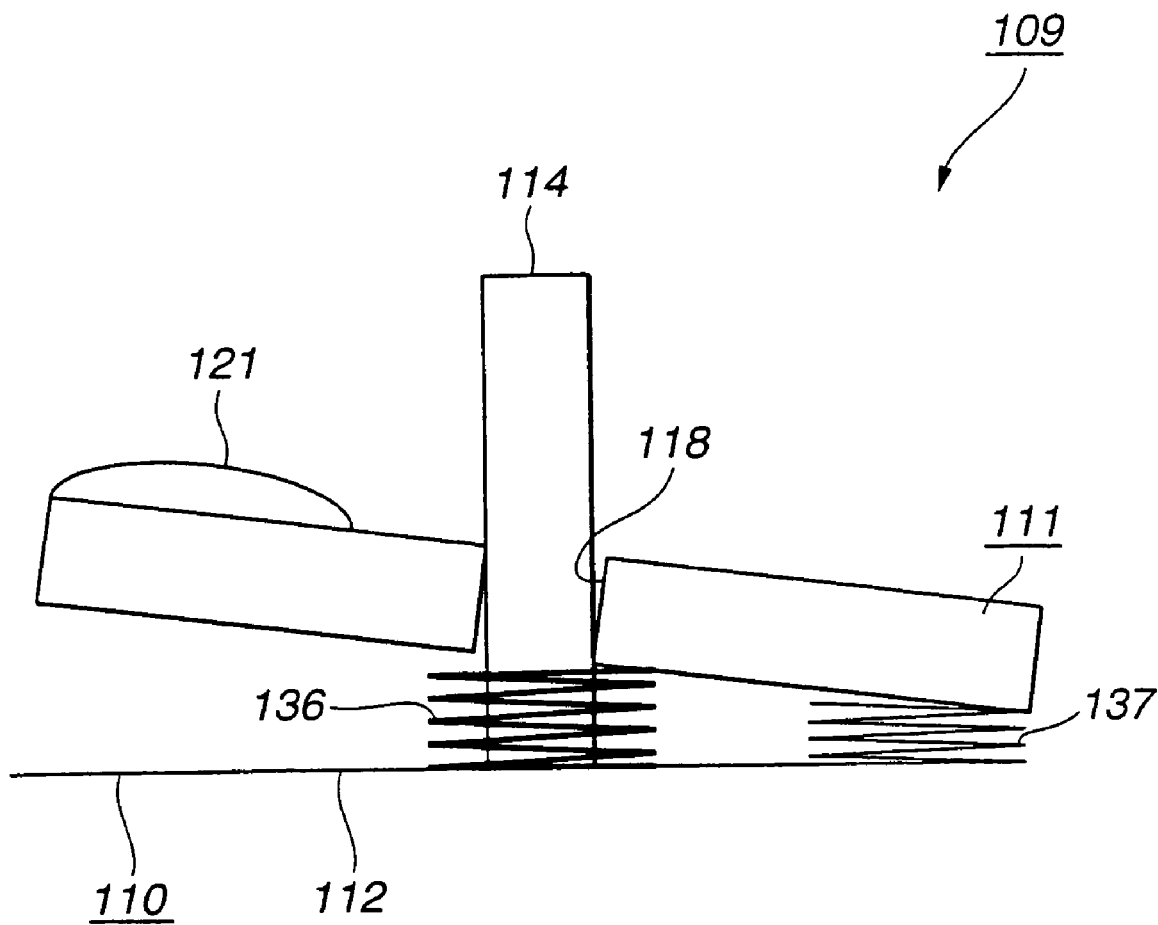
FIG. 31 is a conceptual view showing the state where movable portion is placed at balance position.

Since a force which moves the movable portion 111 to the neutral position in the focusing direction by the magnetic member 125 is greater than a force rendered to the movable portion 111 by elasticity of the flexible printed wiring board 126, it is necessary to set elastic force of the flexible printed wiring board 126 so that a force in a direction moved to the base portion 112 side of the fixed portion 110 is rendered to the movable portion 111 at all times within the movement range in the focusing direction of the movable portion 111 in order that the movable portion 111 is operated in the state inclined in a predetermined direction at all times with respect to the supporting shaft 114. Accordingly, it is sufficient that a force in a direction to bias the movable portion 111 toward the base portion 112 side takes place in the flexible printed wiring board 126 at all times. For this reason, in the object lens drive device 109 of the present invention, the balance position is set at the base portion 112 side with respect to the movement end of the base portion 112 side within the movement range in the focusing direction of the movable portion 111 (see FIG. 31).

For example, in the case where movement range in the focusing direction is upper and lower 0.5 mm (+0.5 mm to −0.5 mm) with the state where the movable portion 111 is held at the neutral position in the focusing direction (see FIG. 28) being as reference, the balance position is set so that there results the position smaller than −0.5 mm.

By setting the balance position at the base portion 112 side with respect to the movement end of the base portion 112 side within the movement range in the focusing direction of the movable portion 111 in this way, in the object lens drive device 109 of the present invention, a force in a direction where its backward end portion is moved to the base portion 112 side is rendered from the flexible printed wiring board 126 to the movable portion 111 at all times so that the movable portion 111 is operated in the state inclined in backward lower direction at all times, i.e., in the state where the object lens 121 side is inclined in such a manner that it is positioned at the front end side of the supporting shaft 114 (see FIGS. 28 to 30). FIG. 28 shows the state where the movable portion 111 is held at the neutral position in the focusing direction, FIG. 29 shows the state where the movable portion 111 is positioned at the movement end of the upper side in the focusing direction, and FIG. 30 shows the state where the movable portion 111 is positioned at the movement end of the lower side in the focusing direction.

In the object lens drive device 109 according to the present invention, since the movable portion 111 is operated in the state inclined in a predetermined direction at all times with respect to the supporting shaft 114, change does not take place in the inclination direction during the operation of the movable portion 111 to have ability to ensure stable operating state of the movable portion 111 at all times.

Then, a further example of a flexible printed wiring board used in the object lens drive device according to the present invention will be explained with reference to FIGS. 32 and 33.

Figure 32:
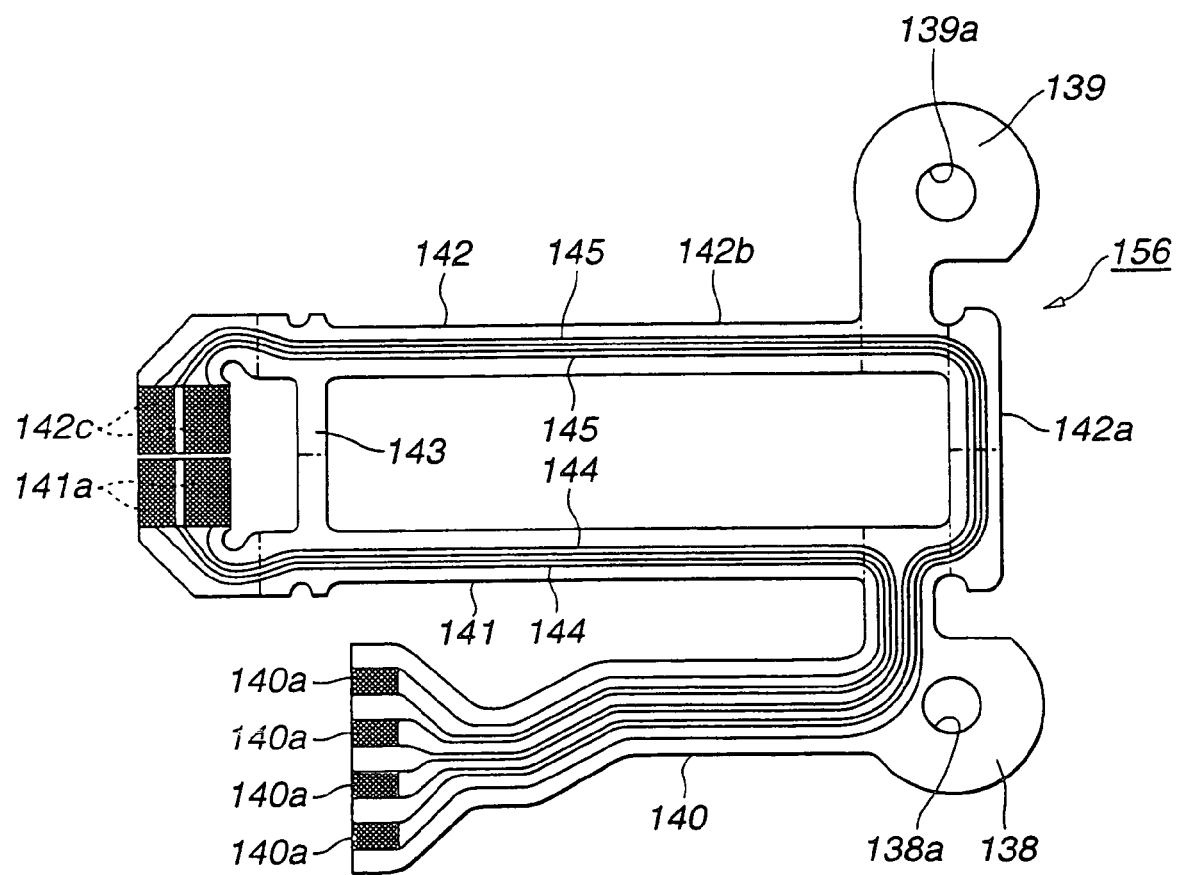
FIG. 32 is a development elevation showing another example of flexible printed wiring board used in the object lens drive device according to the present invention.
Figure 33:
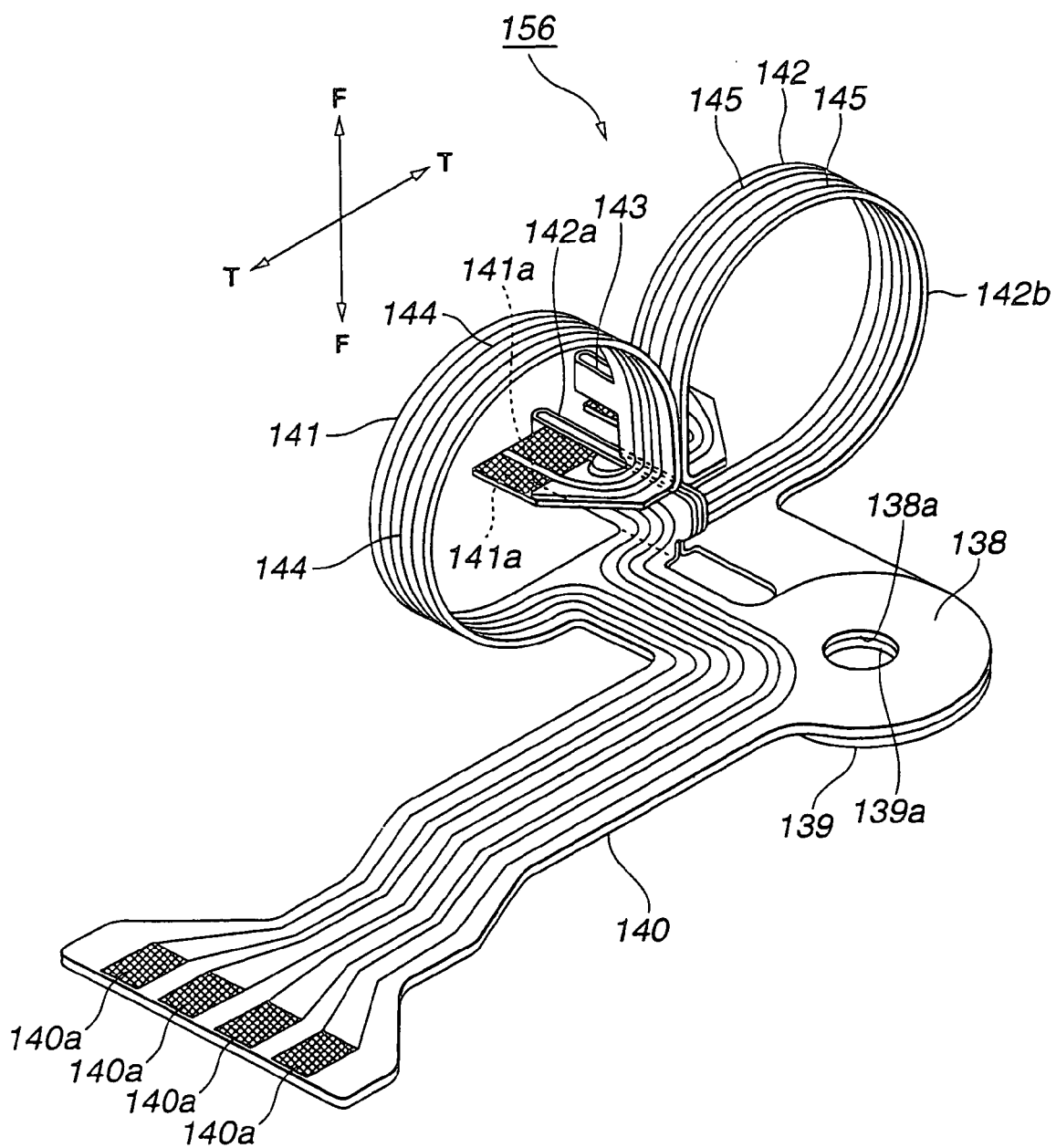
FIG. 33 is an enlarged perspective view showing the state where respective portions of that flexible printed wiring board are attached to movable portion and fixed portion.

A flexible printed wiring board 156 shown in FIGS. 32 and 33 is adapted so that the base is formed by material having flexibility, and includes attachment portions 138, 139 attached to fixed portion 110, a derivation portion 140 projected from the attachment portion 138, and first and second junction portions 141 and 142.

At the attachment portions 138, 139, there are respectively formed holes 138a, 139a.

The derivation portion 140 is formed so that it is elongated substantially in a predetermined direction, and is adapted so that four land portions 140a for circuit are provided at the front end portion in the state spaced to each other when viewed in the developed state shown in FIG. 32.

The first junction portion 141 is provided in a manner extended in the same direction as that of the derivation portion 140 when viewed in the developed state shown in FIG. 32.

When viewed in the developed state shown in FIG. 32, the second junction portion 142 includes a first portion 142a projected in a direction perpendicular to the first junction portion 141 and positioned at the attachment portion 138 side, and a second portion 142b continuous to the first portion 142a and extended in the same direction as that of the first junction portion 141.

The attachment portion 139 is provided in a manner projected toward the side opposite to the attachment portion 138 in the state where the first portion 142a is put therebetween from the end portion of the first portion 142a side of the second portion 142b of the second junction portion 142.

As shown in FIG. 32, the portion close to the front end of the first junction portion 141 and the portion close to the front end of the second portion 142b of the second junction portion 142 are connected by a bridge portion 143. The first junction portion 141 and the second junction portion 142 are formed in the state bent perpendicular in such a manner that the front end portions thereof are respectively close to each other in the horizontal direction.

At the front end portion of the first junction portion 141, land portions 141a, 141a for coil for connecting tracking coil are formed. At the front end portion of the second junction portion 142, land portions 142c, 142c for coil for connecting the focusing coil are formed.

At a flexible printed wiring board 156, as shown in FIG. 32, four circuit patterns 144, 144, 145, 145 are formed. The circuit patterns 144, 144 are circuit patterns to which one coil, e.g., tracking coil 124 is connected, and are respectively formed between land portions 140a, 140a for circuit and land portions 141a, 141a for coil. These circuit patterns extend to the land portions 141a, 141a for coil via the derivation portion 140, the attachment portion 138 and the first junction portion 141 from the land portions 140a, 140a for circuit. The circuit patterns 145, 145 are circuit patterns to which the other coil, e.g., focusing coil 123 is connected, and are respectively formed between the land portions 140a, 140a for circuit and the land portions 142c, 142c for coil. Such circuit patterns extend to the land portions 142c, 142c for coil via the derivation portion 140, the attachment portion 138 and the second junction position 142 from the land portions 140a, 140a for circuit.

The flexible printed wiring board 156 is attached in such a manner that the first junction portion 141 and the second junction portion 142 connect the fixed portion 110 and the movable portion 111.

The flexible printed wiring board 156 is attached to the lower surface of the base portion 112 of the fixed portion 110 in the state where the central portion of the first portion 142a of the second junction portion 142 is bent so that the first portion 141a is folded back, and the attachment portion 138 and the attachment portion 139 overlap with each other. The supporting shaft 114 is slightly projected toward lower direction from the lower surface of the base portion 112, and the attachment portions 138, 139 which have overlapped with each other are attached to the base portion 112 in the state where the lower end portion of the supporting shaft 114 is inserted into holes 138a, 139a. The first junction portion 141 and the second junction portion 142 are curved so as to indicate substantially circular arc shape, and are inserted into slit 117e for insertion of the movable portion 111 in the state where the portions close to the front end of the first junction portion 141 and the second junction portion 142 are in contact with each other in such a manner that the bridging portion 143 is folded back. Such junction portions are bonded by, e.g., double-faced tape, to the lower surface of the base attachment portion 117d in the state where the portion in which the land portions 141a, 141a for coil are formed and the portion in which the land portions 142c, 142c for coil are formed are bent in directions opposite to each other.

At this time, the portions close to the front ends of the first junction portion 141 and the second junction portion 142 of the flexible printed wiring board 156 are inserted into slit 117e for insertion, and the portion where the land portions 141a, 141a for coil are formed and the portion where the land portions 142c, 142c for coil are formed are only bent in directions opposite to each other so that they are bonded to the lower surface of the base attachment portion 117d. For this reason, it is possible to extremely easily carry out attachment with respect to the movable portion 111 of the flexible printed wiring board 156.

The flexible printed wiring board 156 shown in FIGS. 32 and 33 can be inserted into slit 117e for insertion in the state where the bridging portion 143 which connects the portion close to the front end of the first junction portion 141 and the portion close to the second junction portion 142 is bent back, and the portion close to the front end of the first junction portion 141 and the portion close to the front end of the second junction portion 142 overlap with each other. For this reason, there is no necessity of separately inserting the first junction portion 141 and the second junction portion 142 into the slit 117e for insertion. Thus, it is possible to easily carry out attachment with respect to the base attachment portion 117d.

In the state where the flexible printed wiring board 156 is attached in this way, both end portions of the tracking coil 124 are respectively connected to land portions 141a, 141a for coil by soldering, and both end portions of the focusing coil 123 are respectively connected to the land portions 142c, 142c for coil by soldering.

In the state where the flexible printed wiring board 156 is attached to the base attachment portion 117d, the land portions 141a, 141a for coil to which the tracking coils are connected and the land portions 142c, 142c for coil to which the focusing coil is connected are both directed to the base portion 112 side. For this reason, it is possible to easily solder both end portions of the tracking coils 124 and both end portions of the focusing coil 123 with respect to the land portions 141a, 141a, 142c, 142c for coil.

The derivation portion 140 of the flexible printed wiring board 156 is projected toward the side direction from the fixed portion 110, and plural land portions 140a for circuit are respectively connected to respective terminal portions of the current supply circuit.

As shown in FIG. 33, the flexible printed wiring board 156 attached in a manner as described above is disposed in such a manner that width direction of the first and second junction portions 141 and 142 is perpendicular to the focusing direction, and is perpendicular to the tracking direction. The first junction portion 141 and the second junction portion 142 of the flexible printed wiring board 156 are symmetrically disposed with the plane surface including optical axis 121a of the object lens 121 and central axis 114a of the supporting shaft 114 being as reference.

As stated above, in the object lens drive device 109 according to the present invention, even in the case where the flexible printed wiring board 156 is used, when the movable portion 111 is operated in the focusing direction and in the tracking direction, load with respect to the movable portion 111 by rigidity of the flexible printed wiring board 156 is small, and improvement of sensitivity of the movable portion 111 can be realized. Thus, it is possible to ensure satisfactory operating state in the focusing direction and in the tracking direction.

There is no necessity of elongating length of the flexible printed wiring board 156 in order to lessen load with respect to the movable portion 111 by the flexible printed wiring board 156. It is possible to realize miniaturization of the object lens drive device 109 accordingly.

Since the first junction portion 141 and the second junction portion 142 of the flexible printed wiring board 156 are symmetrically disposed with the plane surface including optical axis 121a of the object lens 121 and central axis 114a of the supporting shaft 114 being as reference, it is possible to stably hold the movable portion 111 it the neutral position in the tracking direction.

In addition, since circuit patterns 144, 144 in which drive current is delivered at the time of tracking control and circuit patterns 145, 145 in which drive current is delivered at the time of focusing control are respectively separately formed at the first junction portion 141 and the second junction portion 142 of the flexible printed wiring board 156, it is possible to mutually lessen the influence of noise at the first junction portion 141 and the second junction portion 142.

Practical forms and structures of respective portions shown in the above-described embodiments all only show examples in carrying out the present invention, and various changes or modifications can be made within the scope which does not depart from the gist of the present invention.

INDUSTRIAL APPLICABILITY

As described above, in the present invention, by production of the angular moment, the movable portion in which the object lens is attached is operated in the state inclined in a predetermined direction with respect to the supporting shaft at all times. As a result, there is no possibility that change may take place in direction of inclination with respect to the supporting shaft of the movable portion. Thus, it is possible to ensure stable operating state of the movable portion. Since the movable portion is operated in the state where angular moment in a predetermined direction is produced at all times, it is possible to realize stable focus control and tracking control irrespective of change of attitude of the movable portion.

Since there is no change in direction of inclination with respect to the supporting shaft of the movable portion, it is possible to shorten length of the supporting hole. As a result, it is possible to realize thin structure of the object lens drive device. In addition, since center of line connecting two opening edges of supporting hole of the movable portion and two contact points with respect to the supporting shaft can be positioned on center axis of the supporting shaft portion, balance of the movable portion with respect to the supporting shaft is satisfactory. Thus, it is possible to realize stable focus control and tracking control.

The invention claimed is:

1. An object lens drive device comprising:
   a fixed portion provided in such a manner that a supporting shaft is projected;
   a movable portion composed of an object lens, and a bobbin adapted so that the object lens is attached and a hole through which the supporting shaft is inserted is formed, the bobbin being supported in a manner slidably along the supporting shaft and rotatably with the supporting shaft being as center;
   a coil portion configured to move the movable portion along the supporting shaft to thereby move the object lens in a focus direction, and to rotate the bobbin with the supporting shaft being as center to thereby move the object lens in a tracking direction; and
   a flexible printed wiring board adapted so that a portion is respectively attached to the fixed portion and the movable portion to supply power to the coil portion, and the flexible printed wiring board is adapted so that a width direction of a junction portion which connects the fixed portion and the movable portion is different from the focus direction, and is different from the tracking direction, the flexible printed wiring board is provided so that width direction of the junction is perpendicular to the focus direction, and is perpendicular to the tracking direction.

2. The object lens drive device of claim 1, further comprising:
   supporting means for supporting the movable portion in the state inclined with respect to the supporting shaft, wherein the supporting means comprises a magnetic member attached to the movable portion and adapted for holding the movable portion at neutral position in the focus direction and in the tracking direction in cooperation with the drive portion.

3. The object lens drive device as set forth in claim 2, wherein the supporting means comprises a magnetic member attached to the movable portion, and adapted for holding the movable portion at neutral position in the focus direction and in the tracking direction in cooperation with the drive portion, the magnetic member being attached to the movable portion in such a manner inclined with respect to the supporting shaft.

4. The object lens drive device as set forth in claim 3, wherein the magnetic member is formed to be substantially annular.

5. The object lens drive device as set forth in claim 4, wherein the magnetic member is formed so as to take substantially annular shape in which a portion is cut.

6. The object lens drive device as set forth in claim 5, wherein the magnetic member is attached to the bobbin so that inclination angle with respect to the supporting shaft becomes equal to 20 degrees to 40 degrees.

7. The object lens drive device as set forth in claim 3, wherein the device is adapted so that, in the state where power is not supplied to the coil portion, position in the focus direction with respect to the fixed portion of the movable portion by balance between gravity and elastic force of the flexible printed wiring board is set at the fixed portion side with respect to movement end of the fixed portion side within movement range in the focus direction of the movable portion.

8. The object lens drive device as set forth in claim 3, wherein the coil portion comprises a coil body composed of a focus coil attached to the bobbin and plural tracking coils, a yoke portion in which the magnet portion is attached being formed at the fixed portion.

9. The object lens drive device as set forth in claim 1, further comprising:
   a drive portion including a magnet portion provided at either one of the fixed portion and the movable portion.

10. The object lens drive device as set forth in claim 1, wherein the flexible printed wiring board is adapted so that the junction portion is branched to form a first junction portion and a second junction portion, the first junction portion and the second junction portion being symmetrically disposed with plane surface including optical axis of the object lens and center axis of the supporting shaft being as reference.

11. A disc recording and/or reproducing apparatus comprising:
    a rotation drive unit adapted so that disc is loaded to rotationally drive the loaded disc;
    an optical pick-up; and
    a feed mechanism for moving the optical pick-up in radial direction of the disc, wherein the optical pick-up comprises an object lens drive unit including a fixed portion provided so that a supporting shaft is projected, a movable portion composed of an object lens and a bobbin adapted so that the object lens is attached and a hole through which the supporting shaft is inserted is formed, the bobbin being supported in a manner movably along the supporting shaft and rotatably with the supporting shaft being as center, and a coil portion to move the movable portion along the supporting shaft to thereby move the object lens in a focus direction, and to rotate the bobbin with the supporting shaft being as center to thereby move the object lens in a tracking direction, and supporting means for supporting the movable portion in the state inclined with respect to the supporting shaft,
    a flexible printed wiring board adapted so that a portion is respectively attached to the fixed portion and the movable portion to supply power to the coil portion, the flexible printed wiring board is adapted so that a width direction of a junction portion which connects the fixed portion and the movable portion is different from the focus direction, and is different from the tracking direction, the flexible printed wiring board is provided so that width direction of the junction portion is perpendicular to the focus direction, and is perpendicular to the tracking direction.

12. The disc recording and/or reproducing apparatus of claim 11, further comprising:
    supporting means for supporting the movable portion in the state inclined with respect to the supporting shaft, wherein the supporting means comprises a magnetic member attached to the movable portion and adapted for holding the movable portion at neutral position in the focus direction and in the tracking direction in cooperation with the drive portion.

13. The disc recording and/or reproducing apparatus as set forth in claim 11,
    wherein the supporting means comprises a magnetic member attached to the movable portion, and adapted for holding the movable portion at neutral position in the focus direction and in the tracking direction in cooperation with the drive portion, the magnetic member being attached at the movable portion in a manner inclined with respect to the supporting shaft.

14. The disc recording and/or reproducing apparatus as set forth in claim 13,
wherein the magnetic member is formed to be substantially annular.

15. The disc recording and/or reproducing apparatus as set forth in claim 14,
wherein the magnetic member is formed so as to take substantially annular shape in which a portion is cut.

16. The disc recording and/or reproducing apparatus as set forth in claim 15,
wherein the magnetic member is attached to the bobbin so that inclination angle with respect to the supporting shaft becomes equal to 20 degrees to 40 degrees.

17. The disc recording and/or reproducing apparatus of claim 11, further comprising:
a drive portion including a magnet portion provided at either one of the fixed portion and the movable portion.

18. The disc recording and/or reproducing apparatus as set forth in claim 11,
wherein the flexible printed wiring board is adapted so that the junction portion is branched to form a first junction portion and a second junction portion, the first junction portion and the second junction portion being symmetrically disposed with plane surface including optical axis of the object lens and center axis of the supporting shaft being as center.

19. The disc recording and/or reproducing apparatus as set forth in claim 11,
wherein the object lens drive unit is adapted so that, in the state where power is not supplied to the coil portion, position in the focus direction with respect to the fixed portion of the movable portion by balance between gravity and elastic force of the flexible printed wiring board is set at the fixed portion side with respect to movement end of the fixed portion side within movement range in the focus direction of the movable portion.

20. The disc recording and/or reproducing apparatus as set forth in claim 11,
wherein the coil portion comprises a coil body composed of a focus coil attached to the bobbin, and plural tracking coils, a yoke portion to which the magnetic portion is attached being formed at the fixed portion.

* * * * *